US006424746B1

United States Patent
Nishida

(10) Patent No.: US 6,424,746 B1
(45) Date of Patent: Jul. 23, 2002

(54) FIGURE CLASSIFYING METHOD, FIGURE CLASSIFYING SYSTEM, FEATURE EXTRACTING METHOD FOR FIGURE CLASSIFICATION, METHOD FOR PRODUCING TABLE FOR FIGURE CLASSIFICATION, INFORMATION RECORDING MEDIUM, METHOD FOR EVALUATING DEGREE OF SIMILARITY OR DEGREE OF DIFFERENCE BETWEEN FIGURES, FIGURE NORMALIZING METHOD, AND METHOD FOR DETERMINING CORRESPONDENCE BETWEEN FIGURES

(75) Inventor: Hirobumi Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/179,418

(22) Filed: Oct. 27, 1998

(30) Foreign Application Priority Data

Oct. 28, 1997 (JP) .............................................. 9-295237
Nov. 12, 1997 (JP) .............................................. 9-310152
Jul. 3, 1998 (JP) ............................................ 10-188408

(51) Int. Cl.$^7$ .............................. G06K 9/46; G06K 9/62

(52) U.S. Cl. ........................ 382/195; 382/203; 382/224

(58) Field of Search ................................ 382/203, 206, 382/190, 195, 199, 218, 219, 224, 276

(56) References Cited

U.S. PATENT DOCUMENTS

| | | | | |
|---|---|---|---|---|
| 4,747,153 A | * | 5/1988 | Kuono et al. | 382/203 |
| 5,144,679 A | * | 9/1992 | Kakumoto et al. | 382/113 |
| 5,317,649 A | | 5/1994 | Nishida | 382/202 |
| 5,497,432 A | | 3/1996 | Nishida | 382/178 |
| 5,606,629 A | * | 2/1997 | Shirakawa | 382/203 |

OTHER PUBLICATIONS

Mokhtarian et al, "A Theory of Multiscale, Curvature–Based Shape Representation for Planar Curves"; IEEE Paper ISSN: 0162–8828vol. 14, No. 8, pp. 789–805, Aug. 1992.*

H. Nishida, "Curve Description based on Directional Features and Quasi–Convexity/Concavity", Pattern Recognition, vol.28, No. 7, pp. 1045–1051, Jul. 1995.

Henry S. Baird, "Feature Identification for Hybrid Structural/Statistical Pattern Classification", Computer Vision, Graphics, and Image Processing, vol.42, pp. 318–333, 1988.

F. Stein, et al., "Structural Indexing: Efficient 2–D Object Recognition", IEEE Transactions on Pattern Analysis and Machine Intelligence, vol.14, No. 12, pp. 1198–1204, 1992.

A. Del Bimbo, et al.,"Image Indexing Using Shape–Based Visual Features", Proceedings of 13th International Conference on Pattern Recognition, Vienna, Austria, Aug. 1996, vol.C, pp. 351–355.

H. Bunke, et al., "Applications of Approximate String Matching to 2D Shape Recognition", Pattern Recognition, vol.26, No. 12, pp. 1797–1812, Dec. 1993.

F. Mokhtarian, "Silhouette–Based Isolated Object Recognition through Curvature Scale Space", IEEE Transactions on Pattern Analysis and Machine Intelligence, vol.17, No. 5, pp. 539–544, May 1995.

N. Ueda, et al., "Learning Visual Models from Shape Contours Using Multiscale Convex/Concave Structure Matching", IEEE Transactions on Pattern Analysis and Machine Intelligence, vol.15, No. 4, pp. 337–352, Apr. 1993.

* cited by examiner

Primary Examiner—Amelia M. Au
Assistant Examiner—Mehrdad Dastouri
(74) Attorney, Agent, or Firm—Dickstein Shapiro Morin & Oshinsky LLP

(57) ABSTRACT

A figure is input, and structural features of the input figure are extracted. Structural features of deformed figures are produced, in accordance with a specific transformation rule, from the extracted structural features. The input figure is classified based on the structural features thus extracted and thus produced.

12 Claims, 20 Drawing Sheets

FIG. 2

INDEXES (FEATURES)

⟨3,4⟩ (2,3,1,0,3,2,1,1,1)

⟨3,4⟩ (2,3,1,0,3,2,1,1,2)

⟨5,6⟩ (2,3,1,0,3,2,1,1,1)

MODEL IDENTIFIER LISTS 3, 78, 346, 897

| DIVIDING POINT | PARTIAL SEGMENT | DIRECTION | 凹凸 (CONCAVITY/ CONVEXITY) | SEGMENT |
|---|---|---|---|---|
| 1 | A | 3, 4 | 0 (凸) | |
| 2 | B | 5 | 0 | |
| 3 | C | 6 | 0 | S2 |
| 4 | D | 7 | 0 | |
| 5 | E | 0 | 0 | |
| 6 | F | 1 | 0 | |
| 7 | G | 3, 4, 5 | 1 (凹) | S3 |
| 8 | H | 7 | 0 | |
| 9 | I | 0 | 0 | S4 |
| 10 | J | 1 | 0 | |
| 11 | K | 2 | 0 | |
| 12 | L | 3 | 0 | S1 |
| 13 | M | 7 | 1 (凹) | |
| | A | | | |

FIG. 18
CASE (1)
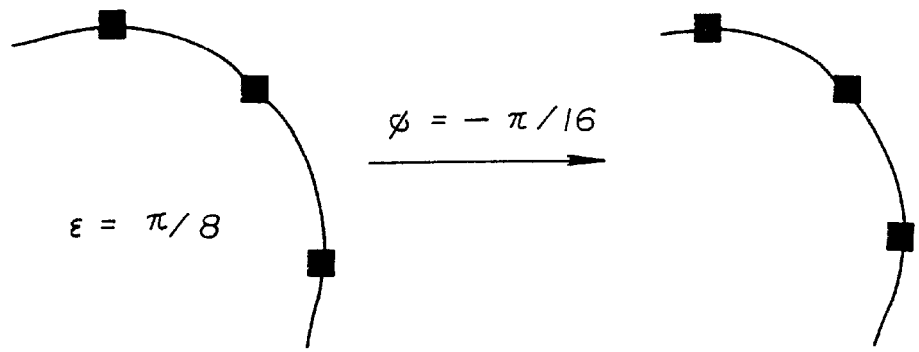
CASE (2)
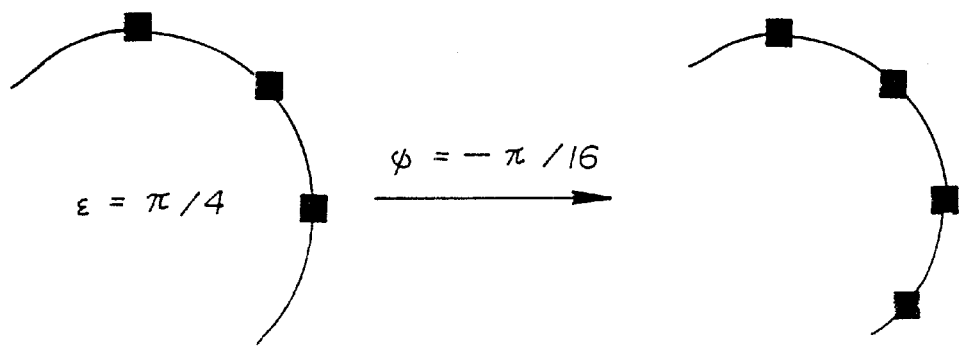
CASE (4)
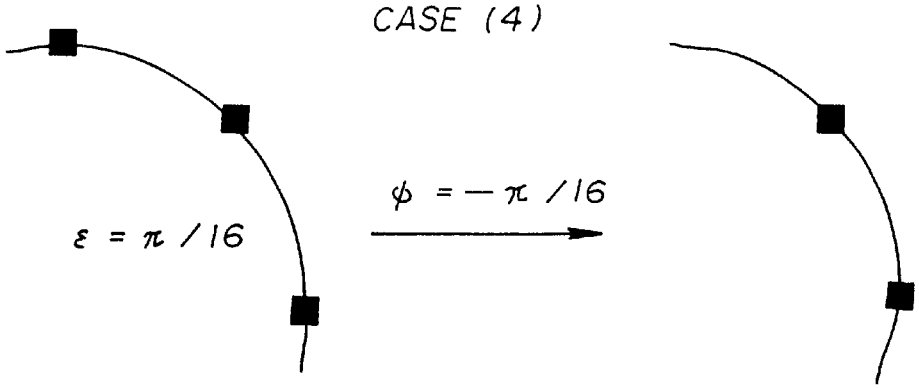

FIGURE CLASSIFYING METHOD, FIGURE CLASSIFYING SYSTEM, FEATURE EXTRACTING METHOD FOR FIGURE CLASSIFICATION, METHOD FOR PRODUCING TABLE FOR FIGURE CLASSIFICATION, INFORMATION RECORDING MEDIUM, METHOD FOR EVALUATING DEGREE OF SIMILARITY OR DEGREE OF DIFFERENCE BETWEEN FIGURES, FIGURE NORMALIZING METHOD, AND METHOD FOR DETERMINING CORRESPONDENCE BETWEEN FIGURES

BACKGROUND OF THE INVENTION

1. Field of the Invention

The present invention relates to classification and search of figures, and, in particular, to a classification and a search using structural features of contours of figures.

2. Description of the Related Art

Because a contour includes all the information of a figure or an object, various methods for classifying (recognizing) of closed contour using models have been devised. In an ordinary algorithm, for a particular model, a mutually independent data-structure model is considered. However, when the number of models increases, efficiency of recognition decreases. Therefore, a method of 'structural indexing' has been considered.

A basic concept of this structural indexing is as follows: For a set of models, one large-scale data structure (table) is prepared; discrete features (structural features) obtained from model figures are used as indexes; and the models are dispersed and disposed in the large-scale data structure. Then, when an input figure is recognized (classified), the features obtained from the input figure are compared with the table. Then, by voting on respective models, models having features the same as those of the input figure are obtained as a result of a narrowing-down operation. As an example of such a data structure, there is a large-scale table in which indexes are calculated from features, and entries of the table corresponding to the thus-obtained indexes are lists of identifiers of models having the features.

In such a structural indexing, for a complex figure, the first candidate obtained from a simple voting is not necessarily a correct answer. When a complex figure is recognized, a small number (several percent to ten percent of the total number of models) of candidate models are obtained as a result of the narrowing-down operation. Then, another complicated algorithm should be applied to the candidate models. Accordingly, conditions required for the structural indexing are that a correct model be surely included in the candidate models obtained from the narrowing-down operation as a result of voting, and that the time required for this process be so short as to be ignored in comparison to the time required for the complicated algorithm which is performed on the narrowed-down candidate models, that is, the speed of this process should be very high. When these two conditions are fulfilled, it is possible to increase the speed of the figure recognition, without degrading recognition accuracy, to several ten times the speed of the conventional figure recognition, through the structural indexing. These two conditions are essential conditions which determine performance and efficiency of figure search using a large-scale figure database.

Such a problem has been considered in earnest recently because capacities of a disk and a memory of a computer are increasing. For example, Baird considered an application to printed character recognition, and devised a method in which one bit is assigned to each feature obtained from a particular model (character figure), and, thereby, a figure is represented by a series of bits as to whether or not the figure has the features (Henry S. Baird, "Feature Identification for Hybrid Structural/Statistical Pattern Classification," Computer Vision, Graphics, and Image Processing, vol. 42, pages 318–333, 1988). This method can be applied when a large amount of training data is present for each character. Structural features such as an arc, a stroke, a crossing, a hole, and an end point are expressed by parameters for each type, clustering is performed on the parameter space, and one bit is assigned to one cluster. When an input figure has a feature corresponding to a cluster, "1" is set for the bit of the cluster. The input figure is classified as a result of classification of thus-formed large-scale dimensions of a bit vector.

However, when only one sample figure can be used for one model figure, this method of Baird cannot be applied. A weak point of the method using structural features is that the features change due to noise or deformation. In the method of Baird, a large number of sample patterns are prepared for one model, and, through statistical and inductive learning using the data, various changes in features which can actually occur are dealt with.

In order to deal with a case where one sample figure can be used for one model, Stein and Medioni devised a method in which a figure contour is approximated by a polygon with various permissible errors, and, then, from a thus-obtained plurality of figures, structural features of the figure are extracted (F. Stein and G. Medioni, "Structural Indexing: Efficient 2-D Object Recognition," IEEE Transactions on Pattern Analysis and Machine Intelligence, vol. 14, no. 12, pages 1198–1204, 1992). Further, Del Bimbo and P. Pala devised a method in which a scale space method in which a curve is smoothed through Gaussian functions having various extents and features of concavity/convexity are extracted, and the structural indexing is integrated (A. Del Bimbo and P. Pala, "Image Indexing using Shape-based Visual Features," Proceedings of 13th International Conference on Pattern Recognition, Vienna, Austria, August 1996, vol. C, pages 351–355). In such methods, based on a description of a structural feature obtained from each scale, a hierarchical data structure is formed considering noise and a local deformation of a contour. However, in the scale space method, a contour is smoothed through Gaussian functions having various extents. As a result, an amount of calculation increases, and, also, a process of finding correspondence of features between adjacent different scales should be performed.

In such a situation in which only one sample can be used for one model, an efficient and effective method for structural indexing which is robust for noise and/or local deformation which changes structural features has not been devised.

Further, various methods for matching (determining correspondence) between two closed contours and classification (recognition) have been devised. However, an actual input figure includes noise and/or global/local deformation. Therefore, when designing algorithm of matching, prerequisites as to what deformation and conversion can be permitted and also how much deformation and conversion can be permitted should be determined. A method in which a change in size cannot be permitted and a method in which rotation cannot be permitted were devised. Further, there are many methods in which only a 'rigid body' which neither expands nor shrinks is considered.

Especially, when affine transformation is considered as a general transformation, it is known that Fourier features and moment features are features which do not change through affine transformation. However, when a shape is classified using these features, high-degree coefficients (the coefficients in Fourier series expansion or the degree number of the moment) are needed. As a result, a large amount of calculation is needed. Further, these high-degree coefficients are sensitive to noise, and only low-degree coefficients are stable. Further, in the methods using these features, a figure is classified merely using coefficient parameters. Therefore, specific point correspondence between figures and transformation parameters cannot be obtained.

In order to eliminate the above-mentioned problems, a method was devised in which a figure is described by a series of features on the contour, and optimum correspondence between two contour feature series is considered. A typical example thereof is a method in which a figure is expressed by concavity/convexity features of the contour. This method has been applied to figure recognition including character recognition. A concavity/convexity structure depends on noise, and, also, a scale, in which a figure is observed. As a result, such a method is called a scale space method. A method was devised in which a closed contour is smoothed through Gaussian functions having various sizes of supports, and a point of inflection which is a point of change in concavity/convexity is extracted (N. Ueda and S. Suzuki, "Learning Visual Models from Shape Contours Using Multiscale Convex/Concave Structure Matching", IEEE Transactions on Pattern Analysis and Machine Intelligence, vol. 15, no. 4, pages 337–352, April 1993, and F. Mokhtarian, "Silhouette-based Isolated Object Recognition through Curvature-Scale Space," IEEE Transactions on Pattern Analysis and Machine Intelligence, vol. 17, no. 5, pages 539–544, May 1995).

An advantage of this method is that, as a result of a curve being represented by features of 'points of inflection', it is possible to use a compact structure expression obtained as a result of information compression. However, in this method, it is not clear what deformation and/or transformation can be permitted. Therefore, when this method is actually used, it is not clear to what points attention should be paid. Further, in a calculation of curvatures from an actual digital image, it is necessary to cause a series of digital points to be approximated by a curve by using a Spline curve and/or a Bezier curve. Thus, a large amount of calculation is needed. Further, in the scale space method, a curve is smoothed through Gaussian functions having various supports (indicating scales), and, then, correspondence of points of inflection between different scales should be found. However, this process requires a large amount of calculation, and, also, there is a large possibility that an error occurs in the process in which correspondence is determined.

Other than the scale space method, a method was devised in which a contour is approximated by a polygon (approximated by dividing line segments), changes in angles of a series of line segments are used as features, the contour is described by a series of characters indicating angle changes, and an approximate string matching method is applied (H. Bunke and U. Buehler, "Applications of Approximate String Matching to 2D Shape Recognition," Pattern Recognition, vol. 26, no. 12, pages 1797–1812, December 1993). However, in this method, because the line segments are used to approximate a contour, information is not sufficiently compressed, and a reduction of an amount of processing is not considered. Further, what is a permissible transformation is not clear, and an editing cost, which is a reference of the approximate string matching, does not necessarily indicate a degree of similarity between figures well. As a result, the editing cost is not suitable as a reference of classification or recognition.

SUMMARY OF THE INVENTION

The present invention has been devised in order to solve the above-mentioned problems. An object of the present invention is to provide a method and a system for figure classification or search which is robust for noise and/or local/general deformation such as that of changing structural features of a figure. Another object of the present invention is to provide a method and system for figure classification or search through efficient and high-speed structural indexing which is robust for noise and/or deformation, in a case where only one sample can be used for one model for a large amount of model figures. Another object of the present invention is to provide, in order to achieve such a method and a system for figure classification or search which is robust for noise and/or deformation, a feature extracting method, a method for producing a table for figure classification, a method for evaluating a degree of similarity or a degree of difference between figures, a method for determining correspondence of structural features of a contour, a figure normalizing method and so forth.

In a pattern extracting method in which a closed contour of a figure (or a line figure itself) is approximated by a polygon, and consecutive line segments of the thus-polygon-approximated contour are integrated into higher-level structural features based on quantized directional features and quasi-concavity/convexity structures of the polygon-approximated contour, it is possible to extract compact structural features through a relatively simple processing. However, the structural features obtained in such a method change due to noise or a local concavity/convexity-structure change due to a scale. Therefore, in a case where only one sample can be used for one model, when figure classification and/or search is performed simply as a result of comparing structural features of a model figure and structural features of an input figure, a correct result may not be obtained due to noise and/or local deformation.

According to the present invention, instead of actually deforming an input figure, structural features, which may be extracted from deformed figures resulting from noise and/or local deformation, are produced from structural features extracted from the input figure, as a result of applying a predetermined rule of feature transformation concerning figure deformation. These respective extracted structural features and produced structural features are used for figure classification or search.

In the structural indexing, a predetermined transformation rule is applied to structural features extracted from a model figure, and, thus, structural features which may be extracted from deformed figures resulting from noise and/or local deformation are produced from the structural features extracted from the model figure. Then, a large-scale table (referred to as a classification table) is prepared in which each index indicates the structural features and an entry corresponding to the index is a list of identifiers of model figures, each having these structural features. The indexes are calculated from the respective structural features extracted from each model figure and produced as a result of application of the transformation rule to the structural features extracted from the model figure. Then, in the entries corresponding to the indexes, the lists of identifiers of the model figures having these structural features are stored, respectively. When figure classification or search is performed, similarly, structural features which may be extracted from deformed figures resulting from noise and/or local deformation are produced from structural features extracted from an input figure. Then, indexes are calculated from the respective structural features extracted from the input figure and produced as a result of application of the transformation rule to the structural features extracted from the input figure. Then, the model identifier lists corresponding to the indexes are referred to and the model identifiers included in the model identifier lists are voted on. Then, the model identifiers each having a large number of votes are determined as candidates. The thus-determined model identifiers are used as search keys for searching a figure database.

In these arrangement, it is possible to perform figure classification or search which is robust for noise or deformation of a figure. Further, because production of the structural features of deformed figures are performed through a relatively small amount of calculation, it is possible to perform efficient figure classification or search.

Further, in a case where only one sample can be used for one model, it is possible to perform efficient and high-speed figure classification or search, through structural indexing, which is robust for noise and deformation. Further, it is possible to easily perform figure classification or search, robust for noise and deformation of a figure, through a computer.

Further, it is possible to obtain structural features considering noise and deformation of a figure through a relatively small amount of calculation. Further, when only one sample can be used for one model, it is possible to produce a table, through a relatively small amount of calculation, which enables figure classification, using structural indexing, robust for noise and deformation of a figure.

Another aspect of the present invention relates to a method for extracting structural features of a contour of a figure, and has been devised in order to solve problems of an amount of calculation for a curve approximation or multiple scales, and to obtain a compact expression having a small number of elements. According to the other aspect of the present invention, the contour of a figure is approximated by dividing line segments (approximated by a polygon), and, based on quantized directional features and quasi-concavity/convexity structures, a plurality of consecutive line segments are integrated into higher-level structural features. Further, in order to respond to local/general change in concavity/convexity structures of the contour of the figure occurring due to noise and/or scale, based on an editing cost required for causing the structural features of the contours of the two figures, for example, an input figure and a previously prepared model figure, to approach one another, an appropriate corresponding relationship between the structural features of the contours of the two figures is obtained. Then, a degree of similarity or a degree of difference between the two figures is expressed more geometrically. Then, as a reference for figure classification (recognition), in order to obtain a distance scale relating to characteristics which the figures inherently have, in accordance with the thus-obtained correspondence relationship, normalization of one of the two figures is performed such that the contour of the one of the two figures approaches the contour of the other of the two figures, as a result of geometric transformation such as affine transformation being performed on the one of the two figures. Then, a geometric distance between the normalized figure and the other figure is calculated. Then, using the thus-calculated distance, a degree of similarity or a degree of difference between the two figures is evaluated. When figure classification is performed, a similar distance calculation is performed between the input figure and each model figure, and at least one model figure having the short distance is selected as a classification candidate.

In these arrangements, it is possible to perform efficient figure classification robust for change in a figure and change in structural features due to noise and/or global/local transformation. Further, it is possible to easily perform such figure classification using a computer.

Further., it is possible to perform appropriate evaluation of a degree of similarity or a degree of difference between two figures even when deformation of the figure and change in the structural features thereof occur. Further, processing for this evaluation can be performed in the feature space, through a relatively small amount of calculation. Further, even when deformation of the figure and change in the structural features thereof occur, through efficient processing in the feature space, appropriate determination of correspondence between the two figures or normalization of the figure can be performed.

Other objects and further features of the present invention will become more apparent from the following detailed description when read in conjunction with the accompanying drawings.

BRIEF DESCRIPTIONS OF DRAWINGS

FIG. 2 shows an example of a classification table for structural indexing;

FIG. 5 shows data obtained through a feature extracting procedure, in a manner in which relationships between the data are shown;

FIG. 18 shows changes in character numbers of a segment due to rotation;

Figure 24:
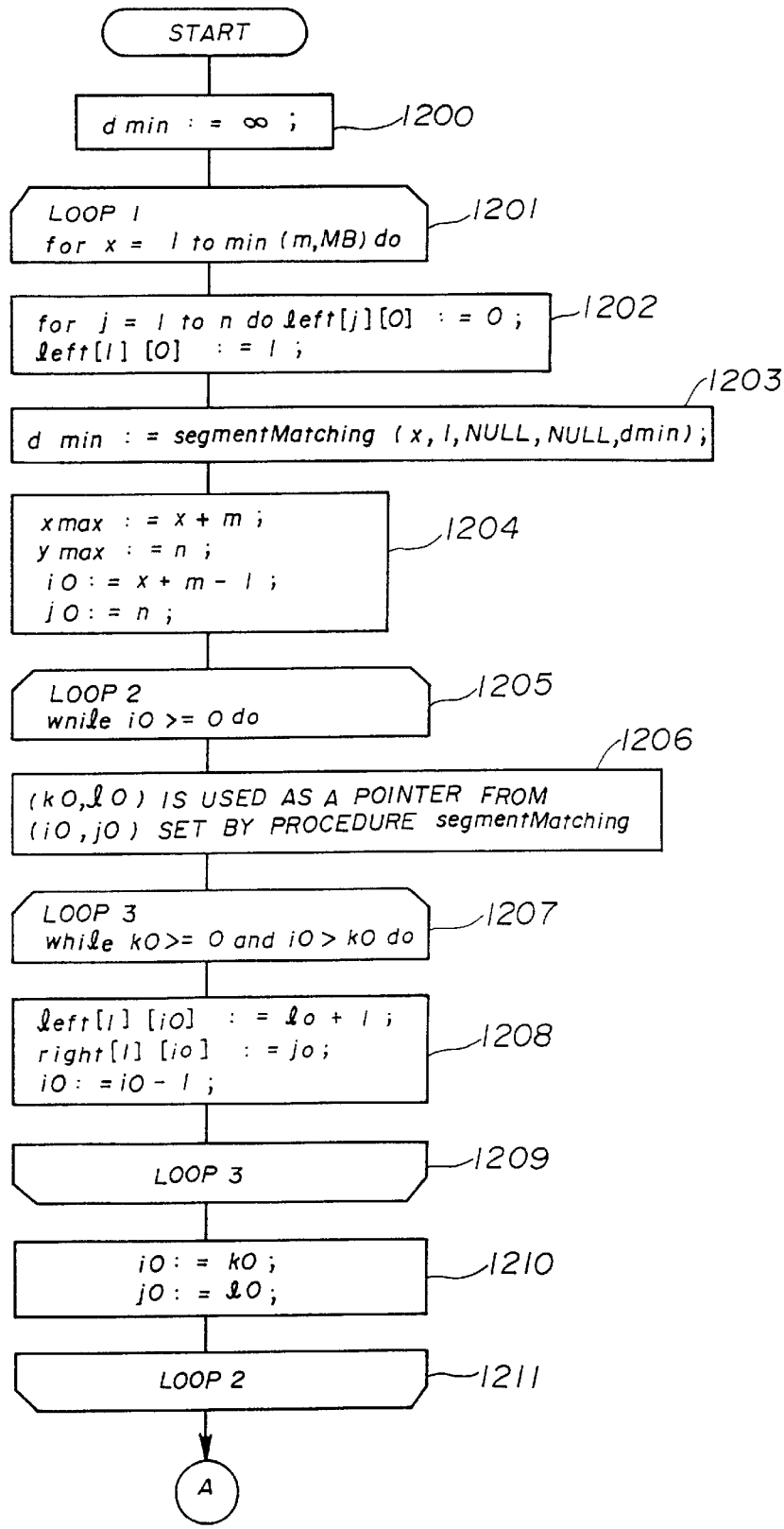
Figure 25:
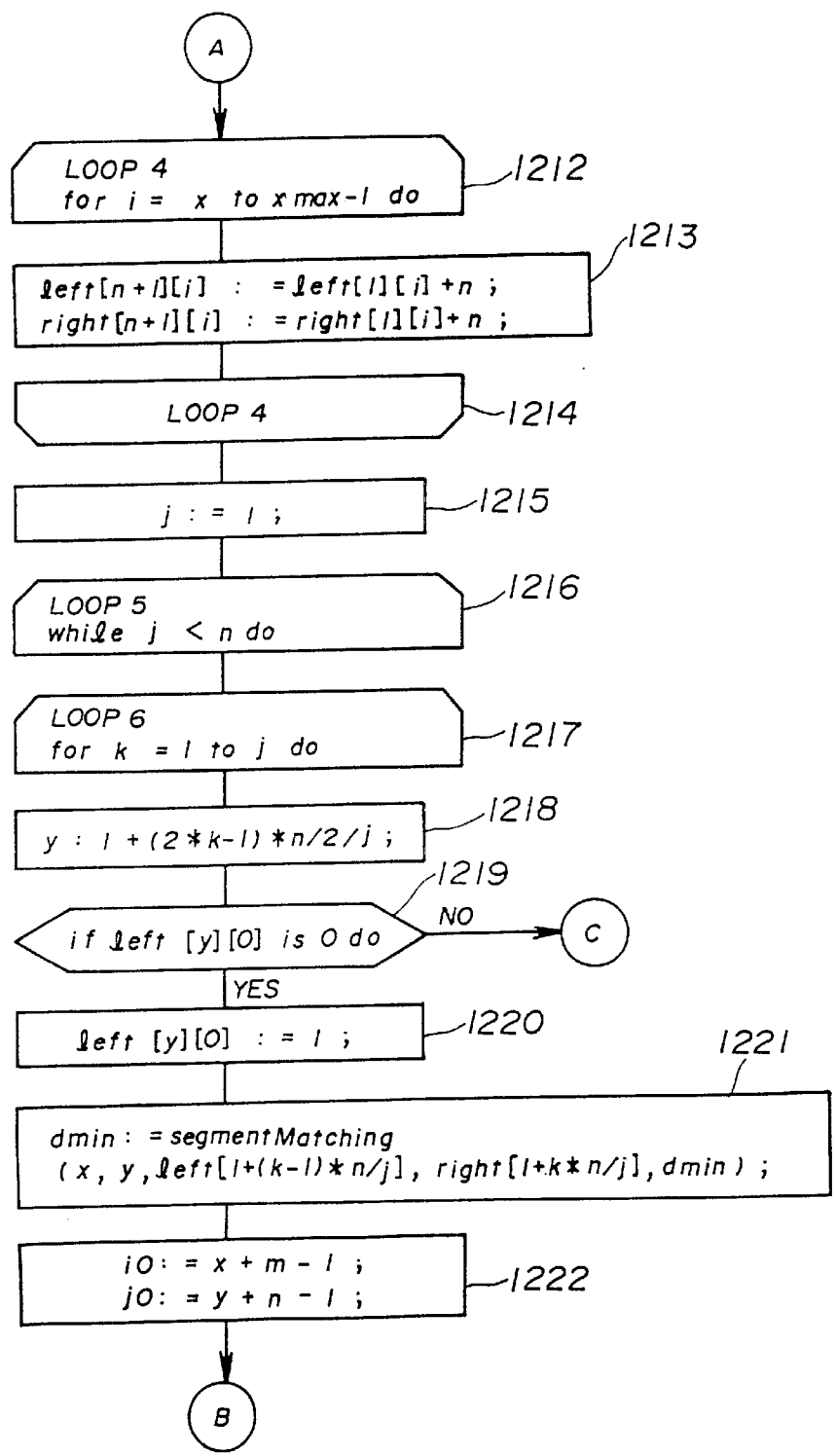
Figure 26:
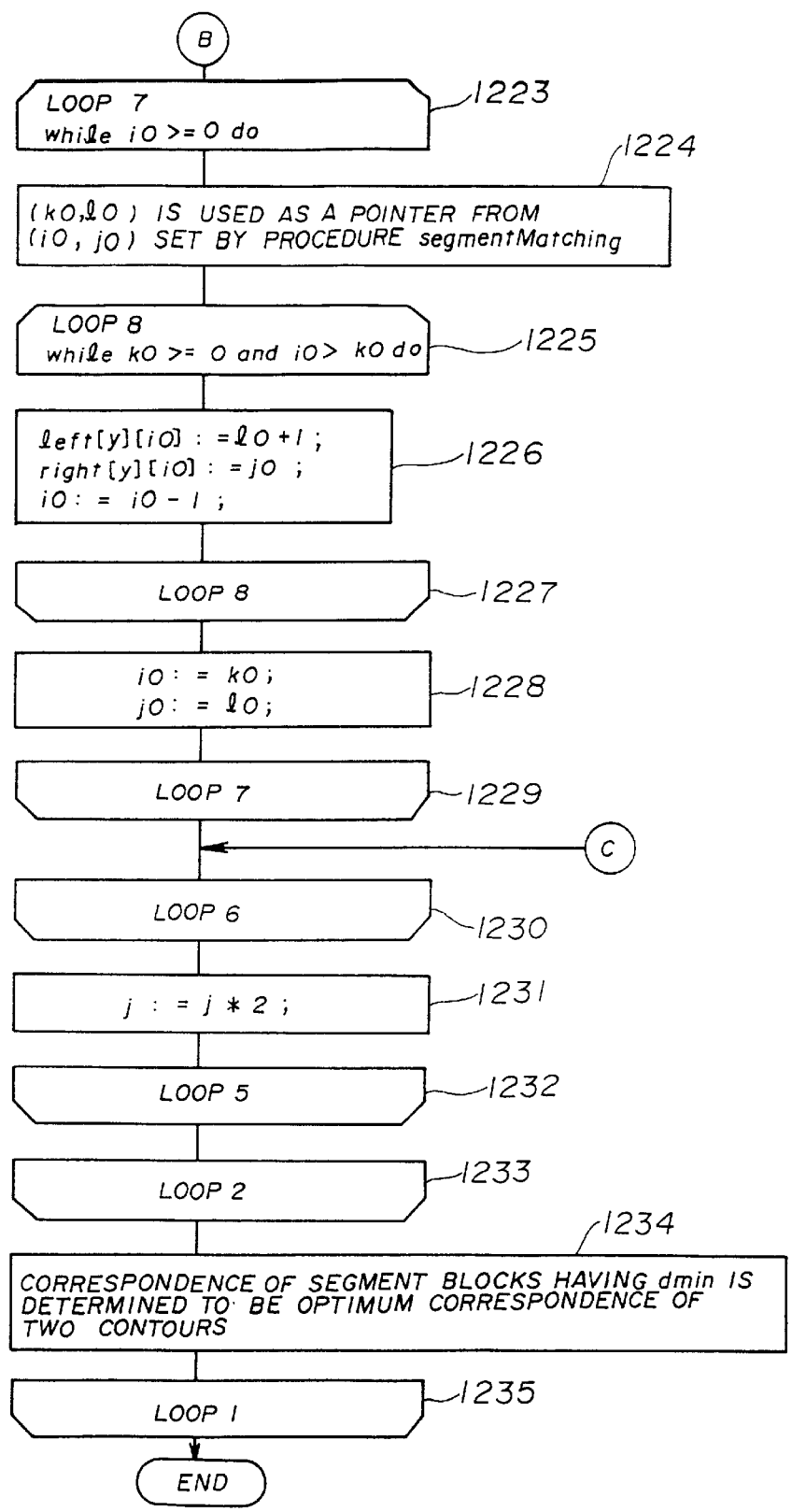
Figure 27:
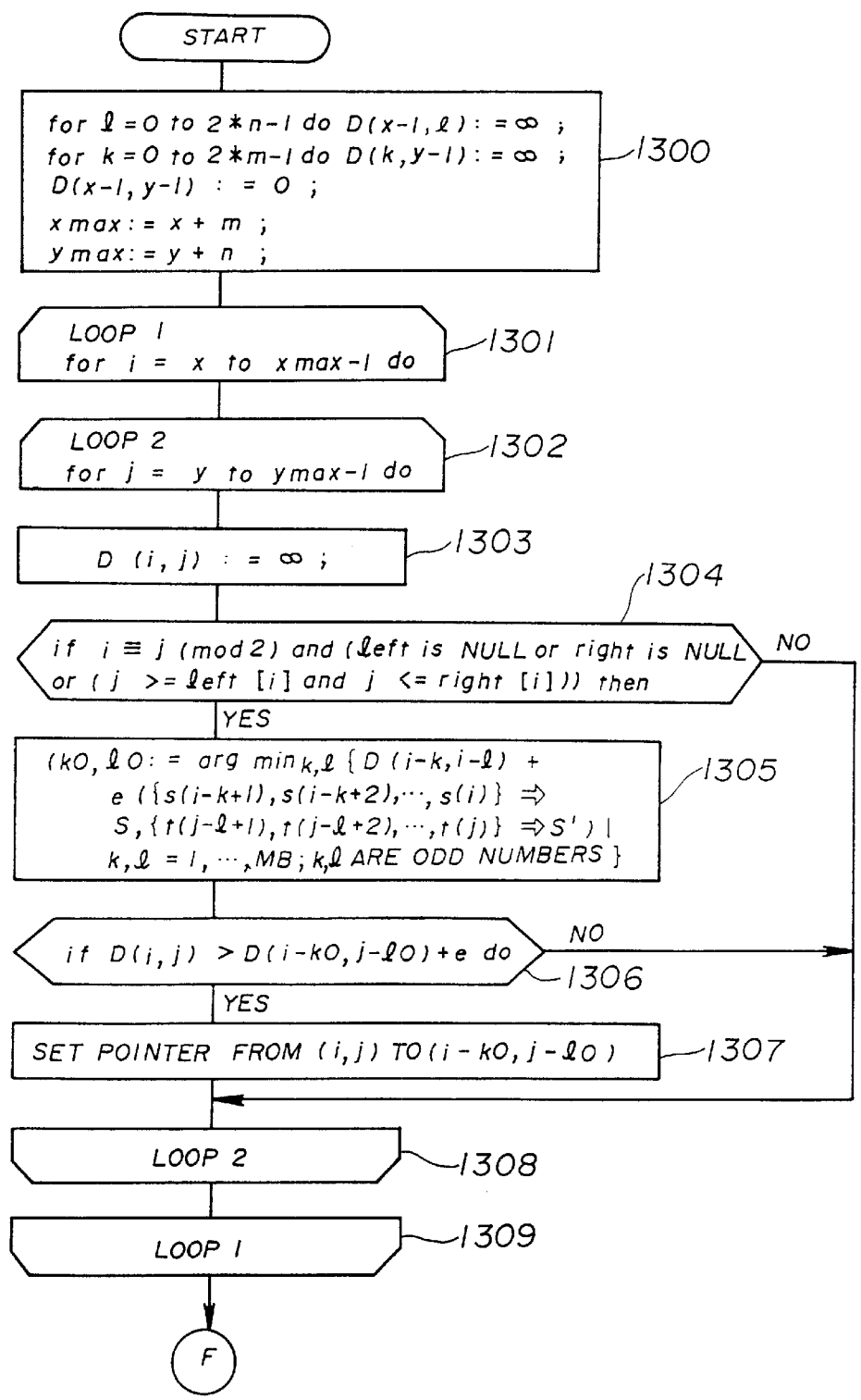
Figure 28:
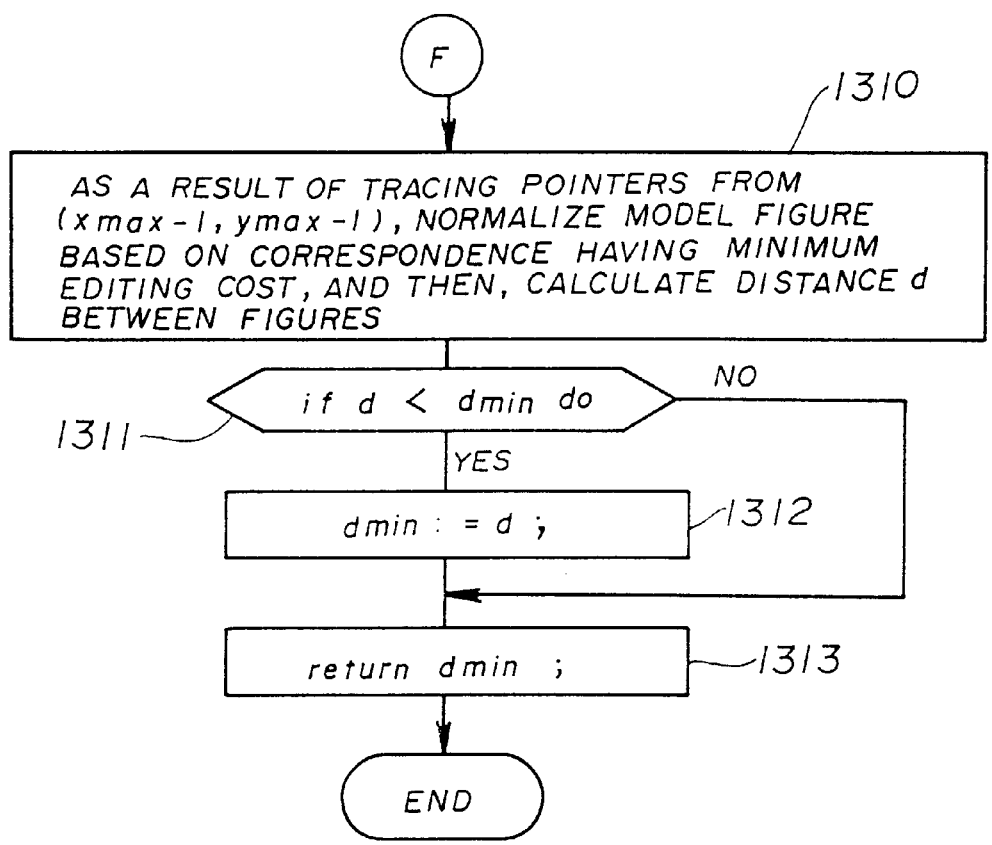

FIGS. 24, 25 and 26 are a flowchart showing an example of a matching algorithm; and FIGS. 27 and 28 are a flowchart showing an example of an algorithm of a function segmentMatching(x, y, left, right, dmin) which is called in the matching algorithm shown in FIGS. 24, 25 and 26.

DETAILED DESCRIPTION OF THE PREFERRED EMBODIMENTS

Figure 1:
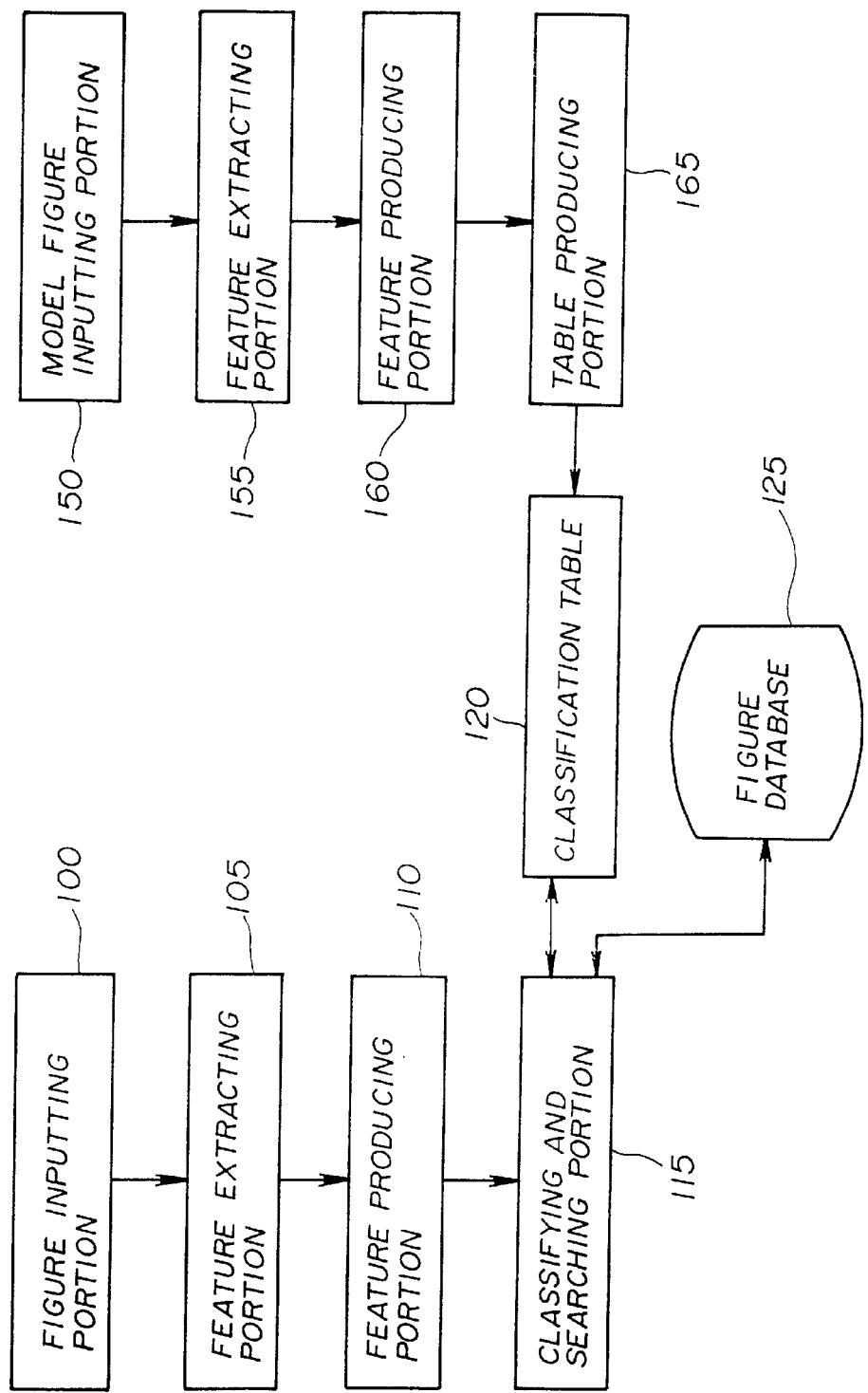
FIG. 1 shows a general arrangement of a figure classifying and searching system in a first embodiment of the present invention.

FIG. 1 shows a general arrangement of a figure classification and search system in a first embodiment of the present invention. In the figure, a figure inputting portion 100 is used for inputting a figure to be classified (recognized), a figure to be used for search, or a figure used as a search key. There is a case where a figure to be thus input is a closed curve indicating the contour of an object or a figure, the closed curve being extracted through a contour extracting operation from an image which is input through equipment such as an image scanner or a digital camera. There is another case where a line figure directly obtained through equipment such as a digitizer is input to the figure inputting portion 100. The thus-obtained line figure may be input to the figure inputting portion 100 after undergoing a line thinning process, if necessary.

In a feature extracting portion 105, the closed contour of the input figure (or the input line figure) is approximated by a polygon (approximated by dividing line segments), then, is analyzed based on quantized directional features and quasi-concavity/convexity features, and, thereby, consecutive line segments are integrated into higher-level structural features. Such a feature extracting method will be described in detail later. Thereby, structural features of a compact expression can be obtained.

The structural features extracted in the feature extracting portion 105 change due to noise and/or local deformation of the contour. Therefore, in the first embodiment, a rule of transformation of structural features, which transformation occurs due to specific deformation, is considered. Then, a feature producing portion 110 applies the rule of transformation to the structural features extracted through the feature extracting portion 105 from the input figure. Thus, structural features of deformed figures which may occur due to noise and/or local deformation are produced. All the thus-produced structural features and the structural features extracted from the input figure are input to a classifying and searching portion 115.

The classifying and searching portion 115 calculates indexes (addresses) from the thus-input respective structural features. Then, entries of a classification table 120, which entries correspond to the thus-calculated indexes, respectively, are referred to, and, thereby, the input figure is classified. When the input figure is classified, the classifying and searching portion 115 outputs a classification result (model identifiers). When a search is made, the classifying and searching portion 115 outputs figures (specifically, the model figures themselves or figures including figures corresponding to the model figures), which have search keys which are the model identifiers obtained as the classification result, after the figure is searched for in a figure database 125.

The classification table may be produced externally of this system. However, in the first embodiment, the classification table can be produced inside the system. In this system, in order to produce the classification table 120, a model figure inputting portion 150, a feature extracting portion 155, a feature producing portion 160 and a table producing portion 165 are provided. The model figure inputting portion 150 has a model figure (closed contours or line figures) input thereto. The feature extracting portion 155 performs a feature extracting operation the same as the operation performed by the feature extracting portion 105. The feature producing portion 160 applies the rule of specific transformation of the structural features, similar to that of the feature producing portion 110, to the structural features extracted through the feature extracting portion 155 from the input model figure. Thus, structural features of deformed figures which can occur due to noise and/or local deformation are produced. The figure inputting portion 100, the feature extracting portion 105 and the feature producing portion 110 can also be used as the model figure inputting portion 150, the feature extracting portion 155 and the feature producing portion 160, respectively. The table producing portion 165 calculates indexes from the structural features extracted by the feature extracting portion 155 and the structural features produced by the feature producing portion 160, respectively. The table producing portion 165 produces a large-scale table such as that shown in FIG. 2 as the classification table 120, in which lists of identifiers of models having these respective structural features are used as entries for the indexes, respectively.

Figure 3:
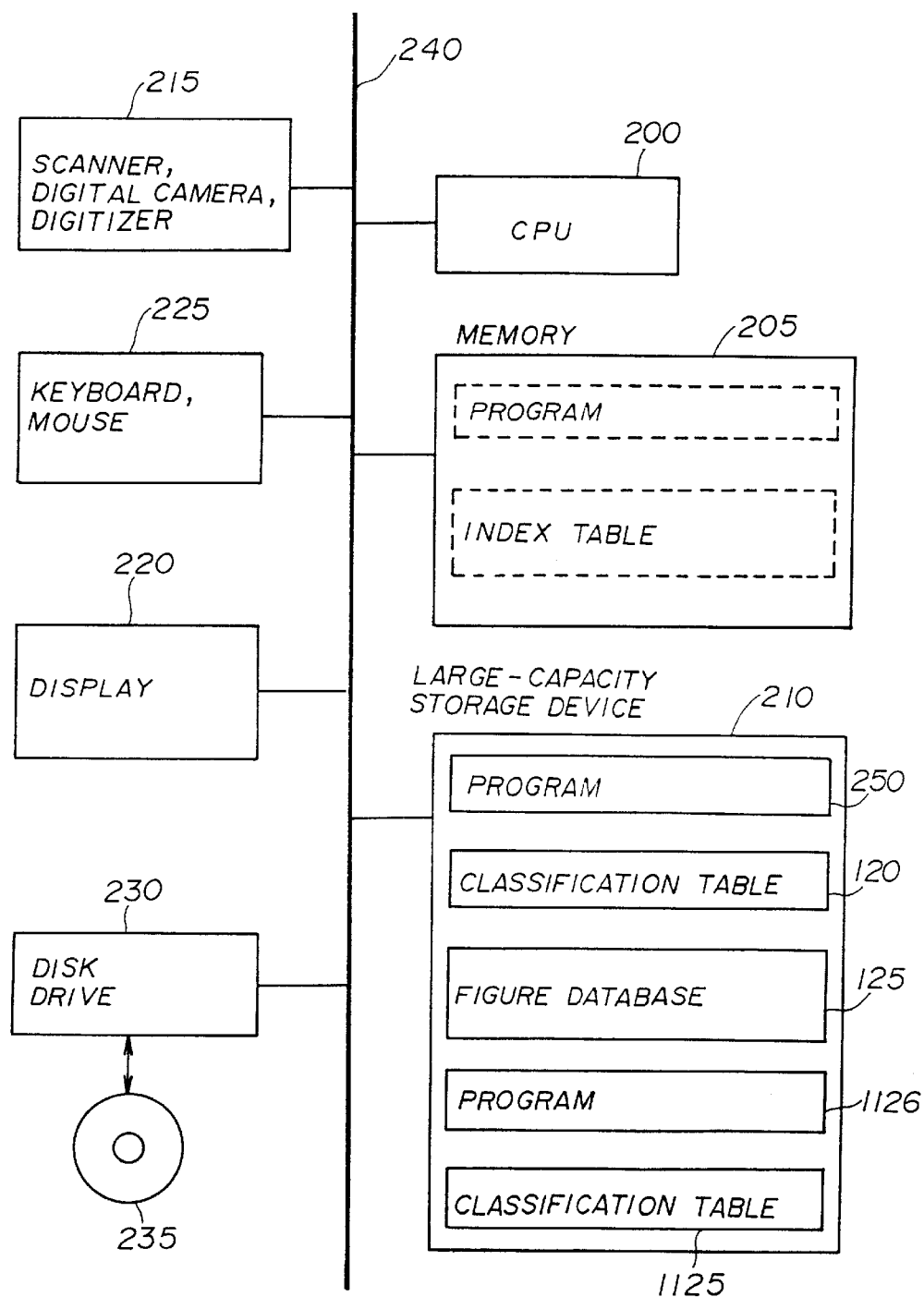
FIG. 3 is a block diagram simply showing a hardware arrangement of a computer for executing functions of the present invention through execution of a program.

This figure classification and search system can be achieved by, as simply shown in FIG. 3, a computer in which a CPU 200, a memory 205, a large-capacity storage device 210 such as a hard disk device, a display 220 for user interface, an inputting device 215 such as a scanner, a digital camera, digitizer or the like for inputting an image or a figure, an inputting device 225 such as a keyboard, a mouse, and so forth, and a disk drive 230 which performs data reading and writing on a recording medium 235 such as a floppy disk, a CD-ROM, or the like are mutually connected via a system bus 240. As a result of a software program being executed by this computer, the figure classification and search system can be achieved. The figure database 125 and the classification table 120 are stored in the large-scale storage device 210. A classifying and search program 250 for performing, through the computer, the functions of the respective functioning portions 100, 105, 110, 115, 150, 155, 160 and 165 (in other words, a series of processing steps in this system), is, for example, read from the disk medium 235 through the disk drive 230, and, all of or a part of this program is loaded in the memory 205 when it is necessary, and is executed by the CPU 200. The classification table 120 may also be read from the disk medium 235. When this program 250 is executed, all or a part of the classification table 120 is loaded in the memory 205, and is referred to. A figure or a model to be classified is input through the inputting device 215, for example.

Each portion of this figure classifying and searching system will now be described in detail.

<Figure Inputting Portion 100 and Model Figure Inputting Portion 150>

Figure 9:
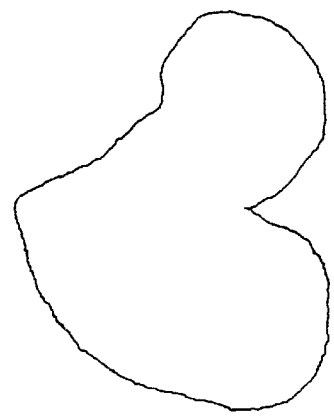
FIG. 9 shows the closed contour of the figure shown in FIG. 8.

The figure inputting portion 100 has a figure to be classified or a figure as a search key input thereto. FIG. 9 shows one example of the closed contour of the input figure. The model figure inputting portion 150 has a similar closed contour of a model figure (or line figure) input thereto.

<Feature Extracting Portion 105 or 155>

Figure 4:
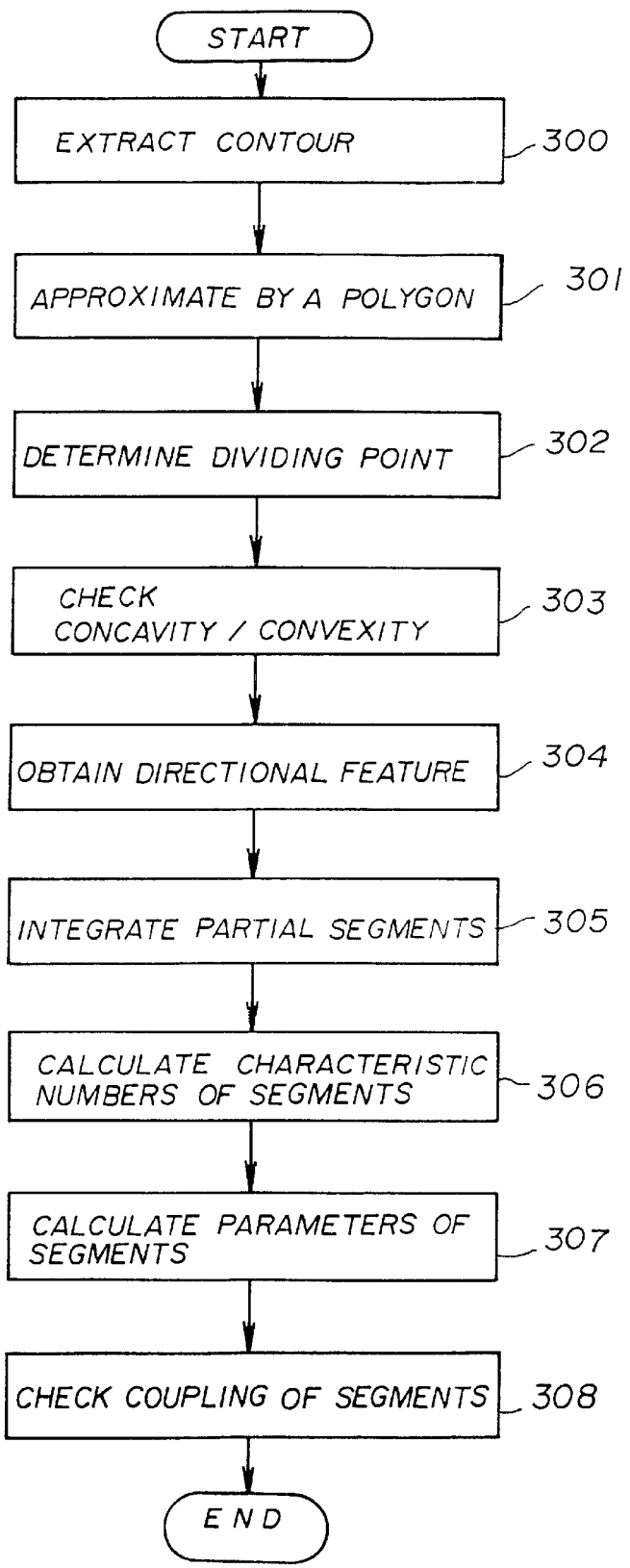
FIG. 4 is a flowchart showing a flow of a feature extracting processing.
Figure 8:
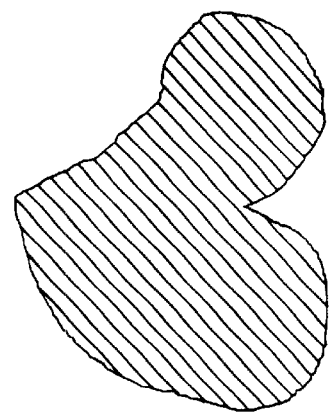
FIG. 8 shows one example of an image of an input figure.

FIG. 4 is a flowchart showing a flow of processing performed by the feature extracting portion 105 or 155. FIG. 5 shows data obtained in the process of feature extraction, which data has relationships as shown in the FIG. 5. A step 300 in FIG. 4 for a contour extracting process is needed only when an image of a figure which needs to undergo the contour extracting operation is input from the figure inputting portion 100. This step 300 is not needed when the contour extracted from a figure is directly input. When a figure shown in FIG. 8 is input, the closed contour shown in FIG. 9 is extracted in the step 300.

The feature extracting portion 105 first causes the closed contour of a figure input from the figure inputting portion 105 (or the closed contour extracted in the step 300) to be approximated by a polygon (in a step 301). This polygon approximation or dividing-line-segment approximation can be performed in a well-known arbitrary method such as Ramer's method. For example, the closed contour shown in FIG. 9 is approximated by a polygon shown in FIG. 10.

The thus-polygon-approximated closed contour is analyzed based on the quantized directional features and quasi-concavity/convexity structures thereof, and the structural features are extracted (in steps 302 through 308). The details of this feature extracting operation are described by H. Nishida, "Curve Description based on Directional Features and Quasi-Convexity/Concavity," Pattern Recognition, vol. 28, no. 7, pages 1045–1051, July 1995. An outline thereof will now be described.

Figure 11:
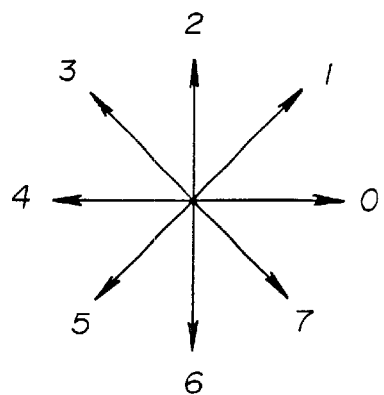
FIG. 11 shows one example of direction axes and quantized direction codes.

In order to determine 2N (where N is a natural number) quantized directional codes, N axes are used. For example, when N=4, as shown in FIG. 11, along the four axes, 8 directional codes, 0, 1, 2, . . . , 6, 7, are defined. Based on these 2N directions and N axes, line segments of the polygon-approximated closed contour are integrated into 'segments', and the contour is analyzed.

Figure 12:
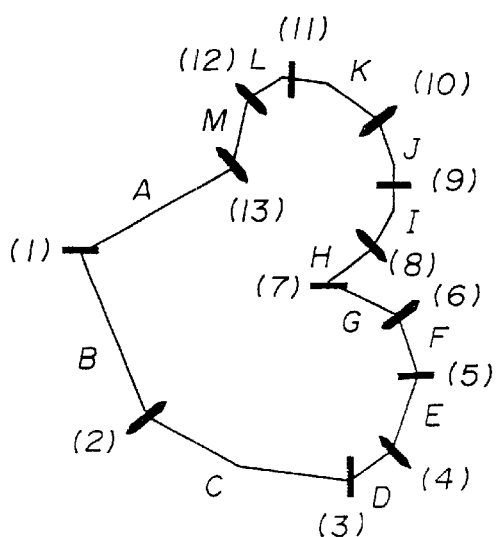
FIG. 12 shows one example of dividing the contour, shown in FIG. 10, into partial segments.

When the closed contour is viewed along the N axes, points which are local maximum points and local minimum points are determined to be dividing points of the contour (in a step 302). For example, when N=4, from the closed contour shown in FIG. 10, the intersection points between the contour and short and thick lines shown in FIG. 12 are extracted as the dividing points. (1), (2), . . . , and (12) are labels for the respective dividing points. These numbers correspond to the numbers shown in FIG. 5, in a column labeled 'DIVIDING POINT'.

The contour is divided into 'partial segments' by the dividing points. In other words, the consecutive line segments of the contour are integrated into 'partial segments'. Each partial segment comprises a set of consecutive line segments (or a single line segment), and is such that the projection, on any one of N axes, of movement tracing the partial segment from one end point to the other end point changes monotonously. For example, from the closed contour shown in FIG. 10, 13 partial segments A, B, C, . . . , M are obtained, as shown in FIG. 12. In FIG. 5, these partial segments are shown in the column labeled 'PARTIAL SEGMENT'. In FIG. 5, The relationship between the dividing points and the partial segments are shown. The dividing point which each adjacent pair of partial segments commonly has is also a 'connection point' of the pair of the adjacent partial segments. Accordingly, such a dividing point will now be referred to as a 'connection point'.

Then, by using the local concavity/convexity structure of the connection point of each pair of adjacent partial segments, a 'direction of connection' (concavity/convexity) is checked (in a step 303). Specifically, when it is assumed that a pair of adjacent partial segments is referred to as 'a' and 'b', then, the contour is traced so that movement from 'a' to 'b' is performed. Then, when the direction of the movement changes counterclockwise around the connection point, this portion of the contour corresponds to a convexity portion. In this case, the direction of connection is referred to as 'a-→b'. When the direction of the movement changes clockwise around the connection point, this portion of the contour corresponds to a concavity portion. In this case, the direction of connection is referred to as 'b-→a'. It is assumed that N=4, and the 'direction of connection' (concavity/convexity) of each connection point shown in FIG. 12 is shown in the column labeled (CONCAVITY/CONVEXITY) in FIG. 5. In the column of (CONCAVITY/CONVEXITY), '0' represents convexity, that is, the 'direction of connection' is a-→b. '1' represents concavity, that is, the 'direction of connection' is b-→a.

Figure 16:
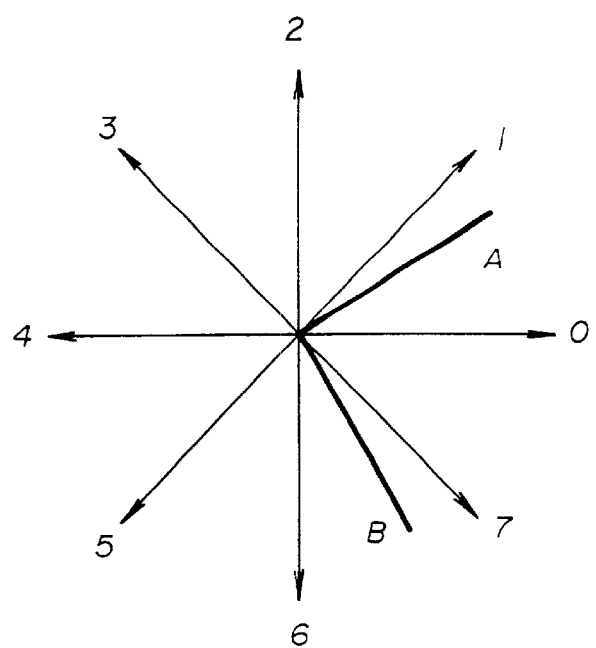
FIG. 16 illustrates a quantized direction for a connection point of partial segments A and B, shown in FIG. 12.
Figure 17:
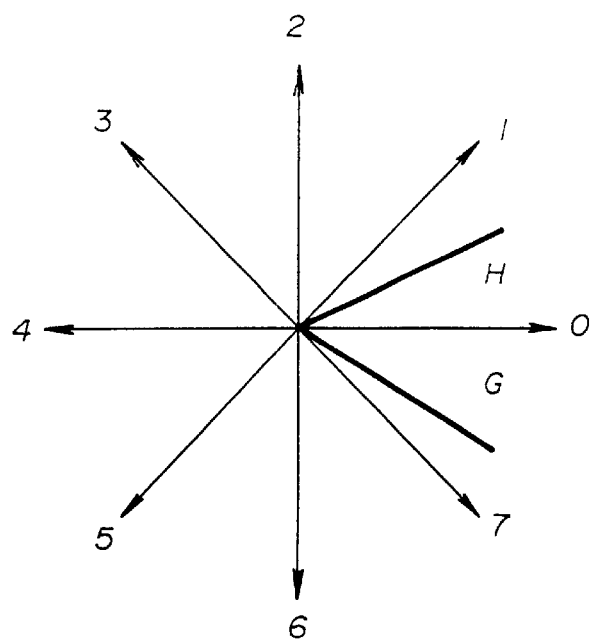
FIG. 17 illustrates a quantized direction for a connection point of partial segments G and H, shown in FIG. 12.

Then, for each connection point, a 'directional feature' is obtained (in a step 304). First, the direction of each connection point is obtained. Specifically, when a pair of adjacent partial segments is traced in the direction of connection, a quantized direction is obtained, in which direction, the pair of adjacent partial segments have an extreme value at this connection point. For example, in a case of the connection value between the partial segments A and B shown in FIG. 12, as is clear from FIG. 16, when the segments A and B are traced from A to B, these partial segments have an extreme value at this connection point in the direction 3 and the these partial segments have an extreme value at this connection point in the direction 4. Further, these partial segments are convex in the direction 3 and also are convex in the direction 4. Therefore, the directions of the connection point are 3 and 4. In a case of the connection value between the partial segments G and H shown in FIG. 12, as is clear from FIG. 17, when the segments G and H are traced from H to G, these partial segments have an extreme value at this connection point in the direction 3, the these partial segments have an extreme value at this connection point in the direction 4 and the these partial segments have an extreme value at this connection point in the direction 5. Further, these partial segments are convex in the direction 3, also are convex in the direction 4, and also are convex in the direction 5. Therefore, the directions of the connection point are 3, 4 and 5. The direction of each connection point of the closed contour shown in FIG. 12 is shown in the column of 'direction' in FIG. 5.

Then, when the connection point of the partial segments 'a' and 'b' (where a-→b or b-→a) points to the quantized directions (j, j+1 (mod 2N), . . . , k), the directional feature of the connection point is represented by $a \xrightarrow{j,k} b$ or $b \xrightarrow{j,k} a$. For example, for the thirteen partial segments shown in FIG. 12, the following features of the connection points are obtained:

$$L \xrightarrow{3,3} M, K \xrightarrow{2,2} L, J \xrightarrow{1,1} K, I \xrightarrow{0,0} J, H \xrightarrow{7,7} I, H \xrightarrow{3,5} G, F \xrightarrow{1,1} G, E \xrightarrow{0,0} F, D \xrightarrow{7,7} E, C \xrightarrow{6,6} D, B \xrightarrow{5,5} C, A \xrightarrow{3,4} B, A \xrightarrow{7,7} M$$

Then, the thus-obtained features of connection points of the partial segments are integrated and the following series is obtained (in a step 305):

$$a_0 \xrightarrow{j(1,0), j(1,1)} a_1 \xrightarrow{j(2,0), j(2,1)} \ldots \xrightarrow{j(n,0), j(n,1)} a_n$$

A partial contour corresponding to the series in this form is referred to as a 'segment'. An end point on $a_0$ of the segment is referred to as a starting point of the segment, and an end point on $a_n$ of the segment is referred to as an ending point of the segment. Then, when each segment is traced from the starting point to the ending point, the direction of this tracing movement always changes counterclockwise at the connection point of each pair of adjacent partial segments of the segment. Therefore, from the thirteen partial segments, shown in FIG. 12, four segments S1, S2, S3 and S4, shown in FIG. 13, that is, S1: $A^{-7,7} \rightarrow M$ S2: $A^{-3,4} \rightarrow B^{-5,5} \rightarrow C^{-6,6} \rightarrow D^{-7,7} \rightarrow E^{-0,0} \rightarrow F^{-1,1} \rightarrow G$ S3: $H^{-3,5} \rightarrow G$ S4: $H^{-7,7} \rightarrow I^{-0,0} \rightarrow J^{-1,1} \rightarrow K^{-2,2} \rightarrow L^{-3,3} \rightarrow M$ are obtained. The column of labeled 'SEGMENT' in FIG. 5 shows correspondence between the respective segments and the partial segments. As is clear from comparison with the column labeled the 'CONCAVITY/CONVEXITY', at the dividing point of concavity (=1), the two partial segments commonly having this dividing point are integrated into one segment. Further, the partial segments between the dividing point of concavity (=1) and the subsequent dividing point of concavity (=1) are integrated into one segment.

Then, characteristic numbers <r, d> which describe a degree and a direction of rotation of each segment is obtained (in a step 306). The characteristic numbers <r, d> are calculated by the following equations, for example:

$$r = \sum_{i=1}^{n} \{(j(i,1) - j(i,0))\%(2N)\} + \sum_{i=1}^{n-1} \{(j(i+1,0) - j(i,1))\%(2N)\} + 2,$$

$$d = j(1,0)$$

In the above equation for r, A%B indicates a remainder occurring when an integer A is divided by a natural number B.

Figure 13:
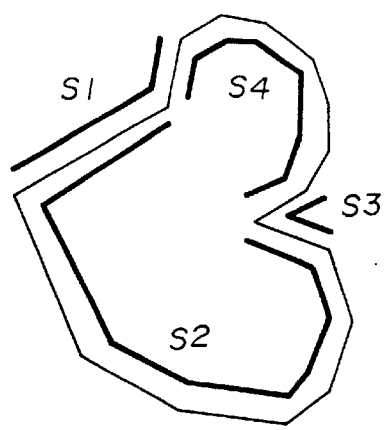
FIG. 13 shows one example of dividing the contour, shown in FIG. 10, into segments obtained as a result of integration of the partial segments.

For example, the characteristic numbers of the four segments shown in FIG. 13 are <2, 7>, <8, 3>, <4, 3> and <6, 7>, respectively.

Further, a coordinate system is set such that the center of the bounding box for the contour (the minimum upright rectangle surrounding the contour) is (0.5, 0.5) and the length of the longer side of the bounding box is 1. In this coordinate system, as features of the size and the position of each segment, the position $(x_S, y_S)$ of the starting point, the position $(x_E, y_E)$ of the ending point, the size (W, H) and the center $(x_C, y_C)$ of the bounding box (the minimum upright rectangle surrounding the segment) are calculated for each segment. Then, these eight real numbers are quantized into 8 integers from 0 through L−1, and, thus, 8 parameters are obtained. Then, after adding the characteristic numbers <r, d> to these 8 parameters, the features of each segment are represented by the following set of ten integers (in a step 307):

(r,d, ⌊L·$x_S$⌋, ⌊L·$y_S$⌋, ⌊L·$x_E$⌋, ⌊L·$y_E$⌋, ⌊L·$x_C$⌋, ⌊L·$y_C$⌋, ⌊L·W⌋, ⌊L·H⌋)

Further, coupling between each pair of adjacent segments is checked, and the coupling of the segments is described (in a step 308). The adjacent segments S and T are coupled in a condition in which these segments commonly have the first partial segment or the last partial segment of the corresponding series. When the first partial segment is commonly had, this coupling is referred to as 'h coupling', and is expressed by S-$^h$-T. When the last partial segment is commonly had, this coupling is referred to as 't coupling', and is expressed by S-$^t$-T. The segments are arranged in the order such that the inside of the figure is always located at the left. Accordingly, the coupling between the four segments S1, S2, S3 and S4 is expressed as follows (see the column labeled 'SEGMENT' in FIG. 5):

S1-$^h$-S2-$^t$-S3-$^h$-S4-$^t$-S1

The contents of processing performed by the feature extracting portion 155 is the same as the contents of processing performed by the feature extracting portion 105 described above, except that the feature extracting portion 155 processes the closed contour (or closed line figure) of the model figure.

<Feature Producing Portion 110 or 160>

As will be described in detail, the classifying and searching portion 115 prepares a ballot box for each model figure. Then, an entry (list of identifiers of the model figures) of the classification table 120 corresponding to the features (set of ten integers) of each segment is referred to. Then, one vote is cast in the ballot box corresponding to each model identifier of this list. Then, in accordance with the number of votes for each model identifier, the input figure is classified. However, as mentioned above, due to noise and/or local deformation of the contour, features of segments of the contour easily change. When using the features of the segments extracted from the input figure and the model figures without considering such change, the number of votes for the correct model figure is not necessarily largest when noise and/or local deformation exists. Thus, this method is not robust for noise and local deformation. Further, when only one sample figure can be used for one model, it is not possible to use a method of statistical and inductive learning in pattern recognition.

In order to solve these problems, in the first embodiment of the present invention, a rule of transformation of features, which transformation occurs due to a certain type of deformation of the figure is produced. Then, as a result of applying the feature transformation rule to the features of the segments extracted from the figure, the segment features are produced, which segment features may be extracted from deformed figures which occur due to noise and/or local deformation. This production of the segment features is performed by the feature producing portions 110 and 160. Then, the segment features extracted from the figure (the input figure or the model figure) and the segment features produced through the transformation rule are used for classification of the input figure, and, also, are used for producing the classification table 120.

As the feature transformation of the segments for noise or local deformation of the contour, specifically the following three types of transformation are considered, for example:

1) change in the segment division of the contour due to change in the concavity/convexity structure occurring due to partial movement of the contour in the normal direction, and re-definition of the quantized degree of rotation and direction, that is, the characteristic numbers <r, d>, due to the change in the segment division;

2) change in the quantized degree of rotation and direction, that is, the characteristic numbers <r, d>, due to small rotation; and 3) change in the features (eight parameters), other than the characteristic numbers, due to change in the size of the segment and movement of the positions of the center and end points of the segment.

These types of feature transformation will now be described one by one.

<<Feature Transformation 1): Partial Movement of the Contour along the Normal Direction>>

Figure 14A:
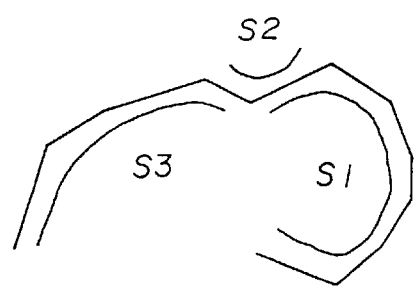
FIGS. 14A and 14B show examples of two partial contours which are generally similar but have different structural features as a result of local deformation.
Figure 14B:
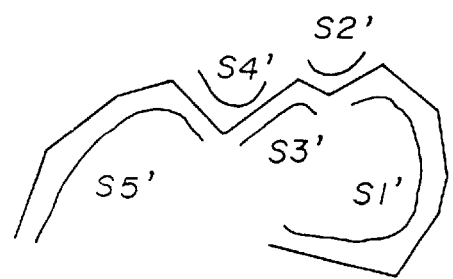

It is possible to obtain a compact expression of the structural features (segment features) from the polygon-approximated contour. However, the segment features are likely to be affected by change in the concavity/convexity due to noise applied to the contour and/or the scale in which the figure is observed. For example, the partial contour shown in FIG. 14A is generally similar to the partial contour shown in FIG. 14B. However due to local deformation, the structural features thereof are different therebetween. When N=4, the partial contour shown in FIG. 14A is expressed by three segments which have the characteristic numbers <6, 6>, <2, 6> and <3, 2>, respectively, and, are coupled as $S1\text{-}^t\text{-}S2\text{-}^h\text{-}S3$. In contrast to this, the partial contour shown in FIG. 14B is expressed by five segments which have the characteristic numbers <6, 6>, <2, 6>, <2, 2>, <2, 6> and <3, 2>, respectively, and, are coupled as $S1'\text{-}^t\text{-}S2'\text{-}^h\text{-}S3'\text{-}^t\text{-}S4'\text{-}^h\text{-}S5'$.

Figure 15A:
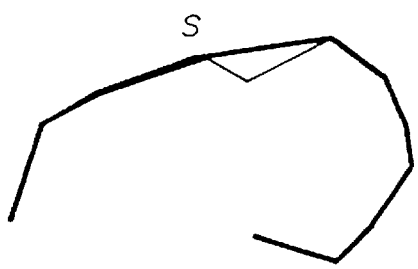
FIGS. 15A and 15B show an example of editing for causing the two partial contours, shown in FIGS. 14A and 14B, to approach one another.
Figure 15B:
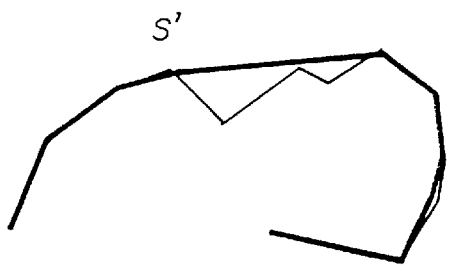

Such a structure change due to noise and/or observation scale can be considered as deformation of the contour along the normal direction. Therefore, in order to absorb such deformation, it is considered to edit the segments so that the structural features are similar to one another. In the case of the two partial contours, {S1, S2, S3} and {S1', S2', S3', S4', S5'} are replaced by the two segments S and S' respectively, and, as a result, the portions of S2, S2', S3', S4' are covered, as shown in FIGS. 15A and 15B. Thereby, these partial contours are transformed so that these contours have the similar structural features.

Generally, the transformation is performed in accordance with the following rule:

(1) For n consecutive segments (where n is an odd number) $S_i$ (i=1, ..., n), which are coupled as $S1\text{-}^h\text{-}S2^t\text{-}\ldots\text{-}^t\text{-}Sn$, for example, and have the characteristic numbers $<r_i, d_i>$, when $$r_{2i-1} - r_{2i} + r_{2i+1} \geq 2 (i=1, 2, \ldots, \lfloor n/2 \rfloor),$$

integration condition 1 is applied, that is, these n segments are integrated into one segment S having the characteristic numbers $$\left\langle \sum_{i=1}^{n} (-1)^{i+1} r_i, d_n \right\rangle.$$

(2) For n consecutive segments (where n is an odd number) $S_i$ (i=1, ..., n), which are coupled as $S1\text{-}^t\text{-}S2^h\text{-}\ldots\text{-}^h\text{-}Sn$, for example, and have the characteristic numbers $<r_i, d_i>$, when $$r_{2i-1} - r_{2i} + r_{2i+1} \geq 2 (i=1, 2, \ldots, \lfloor n/2 \rfloor),$$

integration condition 2 is applied, that is, these n segments are integrated into one segment S having the characteristic numbers $$\left\langle \sum_{i=1}^{n} (-1)^{i+1} r_i, d_1 \right\rangle.$$

In the feature producing portion 110 or 160, an integer parameter indicating the maximum number of segments to be integrated is assumed to be M. For each segment obtained from the polygon-approximated closed contour of the input figure or the model figure, the n consecutive segments (n=1, 3, ..., M) are integrated through the above-mentioned rule, and the characteristic numbers of the thus-deformed segment are produced. When it is assumed that the number of segments which are extracted from the closed contour is m, by the above-mentioned rule, the number on the order of mM (hereinafter, referred to as the number of O (mM)) of the characteristic numbers are produced. For example, when N=4, the four segments of FIG. 13 have the characteristic numbers <2, 7>, <8, 3>, <4, 3>, <6, 7>. Then, when M=3, six sets of characteristic numbers <2, 7>, <8, 3>, <10, 3>, <4, 3>, <6, 7>, <12, 7> are produced.

<<Feature Transformation 2): Change in the Characteristic Numbers due to Rotation of the Figure>>

The characteristic numbers <r, d>(r≧2) may change due to rotation of the figure. It is assumed that the segment having the characteristic numbers <r, d> is expressed by the following series:

$$a_0\text{-}^{d, d}\text{-}a_1\text{-}^{d+1, d+1}\rightarrow \ldots \text{-}^{r+d-2, r+d-2}\rightarrow a_n.$$

When this segment is rotated by angle $\Psi$ $$\left(\text{where} -\frac{\pi}{N} \leq \Psi \leq \frac{\pi}{N}\right),$$

this segment may change in the following 5 ways:

$$a_0\text{-}^{d,d}\rightarrow a_1\text{-}^{d+1, d+1}\rightarrow \ldots \text{-}^{r+d-2, r+d-2}\rightarrow a_n \quad (1)$$

$$a_{-1}\text{-}^{d-1, d-1}\rightarrow a_0\text{-}^{d,d}\rightarrow a_1\text{-}^{d+1, d+1}\rightarrow \ldots \text{-}^{r+d-2, r+d-2}\rightarrow a_n \quad (2)$$

$$a_0\text{-}^{d,d}\rightarrow a_1\text{-}^{d+1, d+1}\rightarrow \ldots \text{-}^{r+d-2, r+d+2}\rightarrow a_n\text{-}^{r+d-1, r+d-1}\rightarrow a_{n+1} \quad (3)$$

$$a_0\text{-}^{d,d}\rightarrow a_1\text{-}^{d+1, d+1}\rightarrow \ldots \text{-}^{r+d-3, r+d+3}\rightarrow a_{n-1} \quad (4)$$

$$a_1\text{-}^{d+1, d+1}\rightarrow \ldots \text{-}^{r+d-2, r+d-2}\rightarrow a_n \quad (5)$$

As can be understood from these respective cases, the characteristic numbers are transformed, as a result of the segment being slightly rotated, as follows:

<r, d>   (1)

<r+1, d−1>   (2)

<r+1, d>   (3)

<r−1, d>(r≧3)   (4)

<r−1, d+1>(r≧3)   (5)

For example, in the arc:

$$\left\{(\cos\theta, \sin\theta) \left| \frac{d}{N}\pi - \varepsilon \leq \theta \leq \frac{r+d-1}{N}\pi + \varepsilon, 0 < \varepsilon \leq \frac{\pi}{N} \right. \right\}$$

having the characteristic numbers <r, d>, $\varepsilon=\pi/(2N), \phi=\pi/(4N)$   (1)

$\varepsilon=\pi/N, \phi=-\pi/(4N)$   (2)

$\varepsilon=\pi/N, \phi=\pi/(4N)$   (3)

$\varepsilon=\pi/(4N), \phi=-\pi/(4N)$   (4)

$\varepsilon=\pi/(4N), \phi=\pi/(4N)$   (5)

should be considered. Among them, for cases (1), (2) and (4), examples of the transformation when N=4, r=4, d=0 are shown in FIG. 18.

The feature producing portions 110 and 160 apply the transformation rule (feature transformation 1)) of 'partial movement of the contour along the normal direction', and produce, for each segment, the characteristics numbers for a maximum of [M/2] deformed segments. Then, for each pair of the thus-produced characteristic numbers, a maximum of 5 pairs of characteristic numbers are produced in accordance with the transformation rule (feature transformation 2)) of 'change in the characteristic numbers due to rotation of the figure'. Accordingly, from each segment, a maximum of 5·[M/2] pairs of characteristic numbers are produced as a result of application of the feature transformation 1) and the feature transformation 2). When it is assumed that the number of segments which are extracted from the contour is m, in this stage, O (mM) pairs of characteristic numbers are produced.

For example, when N=4, the four segments shown in FIG. 13 have the characteristic numbers <2, 7>, <8, 3>, <4, 3>, <6, 7>, respectively. When the feature transformation 1) is applied thereto, when M=3, six pair of characteristic numbers <2, 7>, <8, 3>, <10, 3>, <4, 3>, <6, 7>, <12, 7> are produced. When the feature transformation 2) is applied to the thus-produced characteristic numbers, 28 pairs of characteristic numbers <2, 7>, <3, 6>, <3, 7>, <8, 3>, <9, 2>, <9, 3>, <7, 3>, <7, 4>, <10, 3>, <11, 2>, <11, 3>, <9, 3>, <9, 4>, <4, 3>, <5, 2>, <5, 3>, <3, 3>, <3, 4>, <6, 7>, <7, 6>, <7, 7>, <5, 7>, <5, 8>, <12, 7>, <13, 6>, <13, 7>, <11, 7>, <11, 8> are produced.

<<Feature Transformation 3): Local Change in the Size and the Position>>

The parameters of the segment, that is, the position ($x_S$, $y_S$) of the starting point, the position ($x_E$, $y_E$) of the ending point, the size (W, H) and the center ($x_C$, $y_C$) of the bounding box of the segment (the minimum upright rectangle surrounding the segment) change due to local deformation and/or noise. These parameters $x_S$, $y_S$, $x_E$, $y_E$, $x_C$, $y_C$, W, H are quantized into L levels (where L is a natural number). That is, when the value of a parameter p (any of $x_S$, $y_S$, $x_E$, $y_E$, $x_C$, $y_C$, W, H) is such that $i \leq pL < i+1$ ($0 \leq i < L$), the value of p is quantized to the integer i. An error occurring due to such quantization should be considered.

Therefore, the feature producing portion 160 produces, for a real-number parameter a ($0 \leq a \leq 1$), when $i-pL \leq i+\alpha/2$ ($0 < i < L$), $i-1$ is produced as the quantized value of p in addition to i. Further, when $i+1-\alpha/2 \leq pL < i+1$ ($0 \leq i < L-1$), $i+1$ is produced as the quantized value of p in addition to i.

Accordingly, through the feature transformation 1), the feature transformation 2) and the feature transformation 3), from each segment, a maximum of $5 \cdot 2^8 \cdot [M/2]$ sets of the features are produced, each set including the above-mentioned ten integers. Therefore, when it is assumed that the number of segments extracted from the closed contour is m, a maximum of $5 \cdot 2^8 \cdot [M/2] \cdot m$ sets of the features are produced. Further, when it is supposed that the value of the parameter p is distributed uniformly in a section [0, 1], O $((1+\alpha)^8 \cdot M)$ average sets of the features are produced from one segment, and O $((1+\alpha)8 \cdot Mm)$ average sets of features are produced from one contour.

In the first embodiment, the feature production by application of this feature transformation 3) is performed in the feature producing portion 160 when the model figures are produced, but is not performed in the feature producing portion 110. That is, when the classification table is produced, in comparison to the time when the input figure is classified, a larger number of deformed figures are considered.

Figure 6:
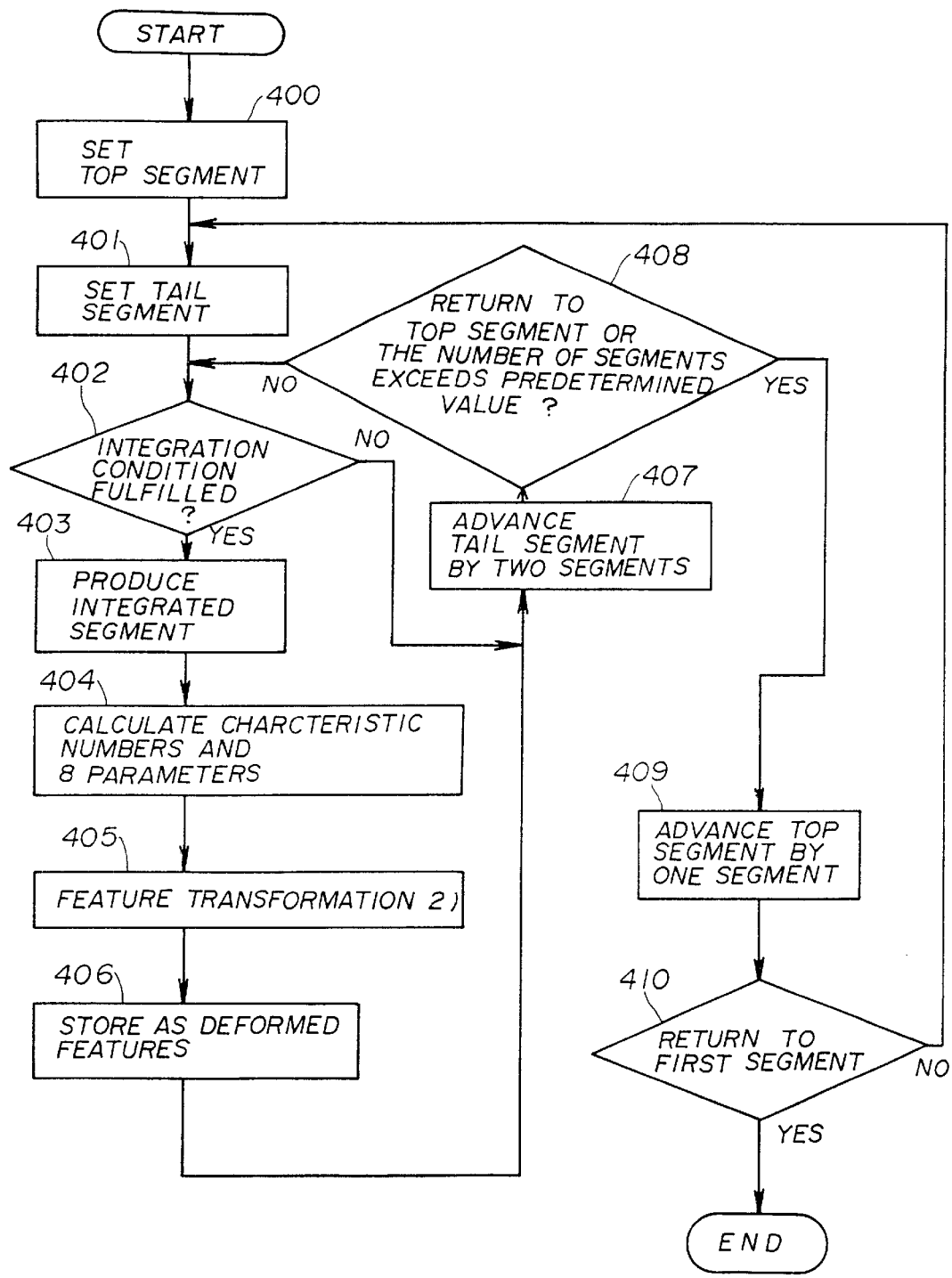
FIG. 6 is a flowchart showing a flow of a feature producing processing.

FIG. 6 is a flowchart showing a flow of the above-described processing performed by the feature producing portion 110. In the feature producing portion 110, first, one segment of the series of segments extracted from the input figure through the feature extracting portion 105 is set as the top segment of the integration candidates for the above-described feature transformation 1) (in a step 400). Then, the third segment from the top segment is set as the tail segment of the integration candidates (in a step 401). Then, for the series of segments from the top segment to the tail segment, it is determined whether the above-mentioned integration condition 1 or 2 for the feature transformation 1) is fulfilled (in a step 402). When none of the integration conditions 1 and 2 is fulfilled, the second segment beyond the current tail segment is set as the new tail segment (the number of segments to be integrated is an odd number) (in a step 407). Then, it is determined whether the above-mentioned integration condition 1 or 2 is fulfilled for the series of segments from the top segment to the new tail segment (in a step 402).

When the integration condition 1 or 2 is fulfilled, the series of segments from the top segment to the tail segment are integrated, and, thus, the integrated segment is produced (in a step 403). Then, in accordance with the fulfilled integration condition, the characteristic numbers and 8 parameters of the integrated segment are calculated (in a step 404). Thus, for example, the series of segments shown in FIG. 14A or 14B are integrated into the segment shown in FIG. 15A or 15B, and the features of the thus-integrated segment are produced.

Thus, the features of the integrated segment are obtained. Then, the above-described feature transformation 2) is applied to this integrated segment (in a step 405). As a result of the application of the feature transformation 2), 5 sets of the features of the deformed segments obtained from the features of the integrated segment through rotation operations performed on the features of the integrated segment are obtained. However, as the eight parameters of each set of the features of the deformed segments, the eight parameters of the integrated segment are used as they are.

The feature producing portion 110 stores the 5 sets of the features of the deformed (produced) segments (in a step 406). Then, the tail segment is advanced again (in the step 407), and the processing starting from the step 402 is continued. Repetition of this processing is continued until the tail segment returns to the top segment or the number of segments from the top segment to the tail segment exceeds a predetermined value.

When the tail segment returns to the top segment or the number of segments from the top segment to the tail segment exceeds the predetermined value (YES in a step 408), the feature producing portion 110 advances the current top segment by one segment and sets the subsequent segment as the new top segment (in a step 409). Then, the processing starting from the step 401 is repeated. When the newly set top segment returns to the first set top segment (YES in a step 410), the processing is terminated.

<Table Producing Portion 165 and Classifying and Searching Portion 115>

In production of the model figures through the structural indexing, the segment features are extracted through the feature extracting portion 155 from the model figure input through the model inputting portion 150. Then, in the feature producing portion 160, the above-described three feature transformations 1), 2) and 3) (transformation models) are applied to the thus-extracted segment features. Thereby, for each model figure, O $((1+\alpha)^8 \cdot Mm)$ average sets of the segment features are produced. The table producing portion 165 calculates the index of the classification table 120 from each set of the segment features. Then, in the model identifier list, which is the entry of the classification table 120, corresponding to this index, the identifier of this model figure is added. Thus, the classification table 120 for the set of the model figures is produced.

If it is assumed that the number of model figures included in the set of model figures is n, and the total number of the indexes of the classification table is I, O $((1+\alpha)^8 \cdot Mmn/I)$ average model identifiers are stored in each entry of the classification table 120. The number $c_i$ of the sets of the features (the number of the indexes), which are produced as a result of application of the feature transformation 1) and the feature transformation 2) to the model figure i (i=1, 2, ... , n), is previously obtained and stored. For example, when N=4 and M=3, and the model figure has the contour shown in FIG. 13, $c_i$=28.

Figure 7:
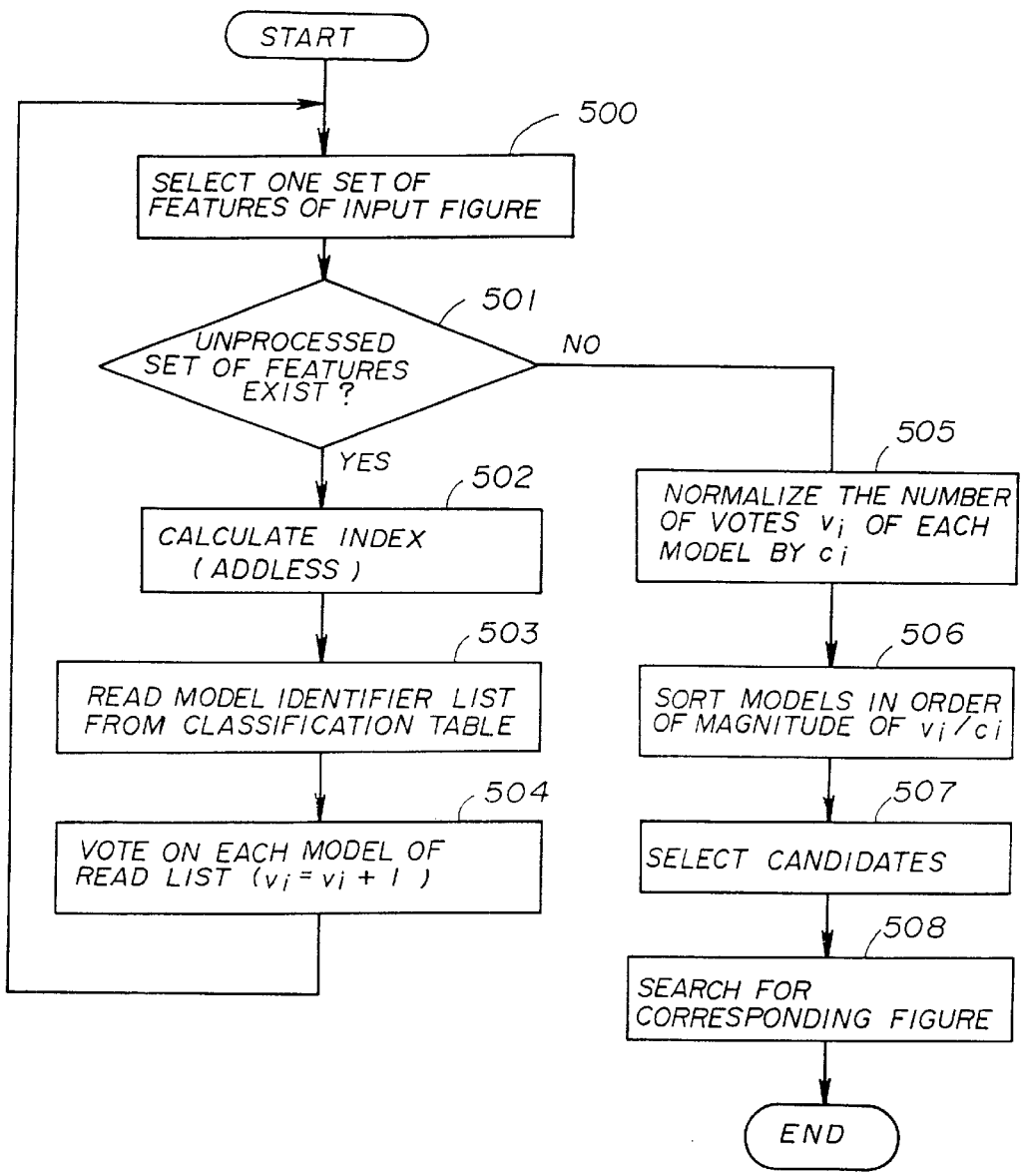
FIG. 7 is a flowchart showing a flow of processing of a classifying and searching portion.

The classifying and searching portion 115 performs a classification of the input figure and a search for the corresponding figure. FIG. 7 is a flowchart showing processing performed by the classifying and searching portion 115.

The classifying and searching portion 115 selects one set of the segment features from the sets of the segment features obtained for the input figure (the set of the segment features obtained from the contour of the input figure, and the sets of the segment features produced as a result of application of the feature transformation 1) and feature transformation 2) to the set of segment features obtained from the contour of the input figure) (in a step 500). Then, from the selected set of the segment features, the index (address) of the classification table 120 is calculated (in a step 502). Then, the entry of the classification table 120 corresponding to the calculated index (address) is accessed, and, thus, the model identifier list of this entry is read (in a step 503). Then, 1 is added to the number of votes $v_i$ corresponding to each model identifier (i) which is included in this model identifier list (in a step 504). The initial value of the number of votes $v_i$ is 0. That is, one vote is cast in the ballot box of the model figure which has a set of the segment features the same as the selected set of segment features for the input figure. The processing loop of steps 500 through 504 is repeated, and a similar voting operation is performed for each of all the sets of segment features for the input figure.

The voting operation is performed for each of all the sets of the segment features for the input figure, and, then, when there is no set of the segment features which has not been processed (NO of a step 501), the number of votes $v_i$ of each model figure i is normalized by $c_i$ (in a step 505). The model figures are sorted in order of magnitude of $v_i/c_i$ (in a step 506). Then, some model figures in the higher ranks are selected as candidates (in a step 507). When classification of the input figure is the object of the processing, the identifiers of the thus-selected model figures are output as the classification result. When a search for the corresponding figure is the object of the processing, the identifiers of the selected model figures are used as the search keys, and, thus, the corresponding figure patterns are obtained from the figure database 125, and the obtained figure patterns are displayed on the display 220 (in a step S508) as the search result.

In the first embodiment, as described above, the specific transformation rules are applied to the structural features extracted from the figure. Thereby, the structural features of the deformed figures are produced. As a result, through a relatively small amount of calculation, the features for the figure classification, which features have been obtained as a result of considering cases where noise and/or local deformation occur, can be obtained. Further, the structural features directly extracted from the model figures and the structural features produced as a result of application of the specific transformation rules to the structural features directly extracted from the model figures are used. As a result, it is possible to produce a table for the structural indexing, which table is obtained as a result of considering cases where noise and/or local deformation occur, through a relatively small amount of calculation. Accordingly, in the case where only one sample figure can be used as one model figure, efficient and high-speed figure classifying and searching, through the structural indexing, which classifying and searching is robust for noise and/or local deformation, can be performed. As a result, the figure classifying and searching system in the first embodiment, and, also, a figure classifying system in a second embodiment of the present invention, described below, are especially advantageous for a use of figure classification and search which requires a flexible response to deformation of a figure, for example, a use for inputting the contour of a leaf of a plant (or an image of a leaf) and determining the type of the plant.

Figure 19:
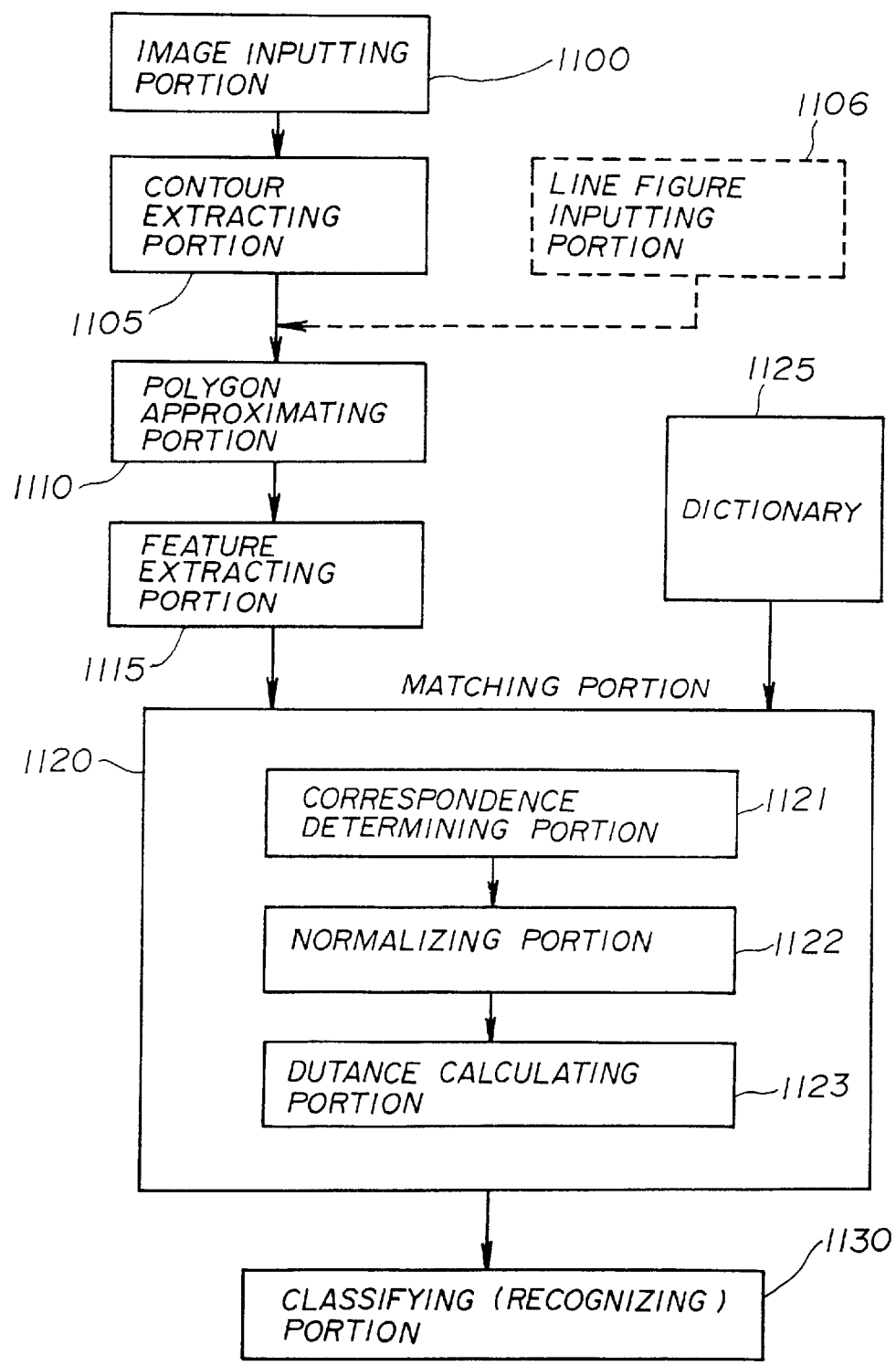
FIG. 19 shows a general arrangement of a figure classifying system in a second embodiment of the present invention.

FIG. 19 shows a general arrangement of a figure classifying system in a second embodiment of the present invention. In the figure, an image inputting portion 1100 is used for inputting an image of a figure which is to be classified (recognized), through an image inputting device such as an image scanner or a digital camera. There, the figure is a closed curve indicating the contour of a figure or an object. A contour extracting portion 1105 extracts the closed contour of the figure from the input image. When a line figure inputting portion 1106 which is used for directly inputting the closed curve indicating the contour of a figure through a digitizer or the like is provided, the contour extracting process is not required to be performed on the figure input through the line figure inputting portion 1106 (in this case, a line thinning process may be performed on the figure input through the line figure inputting portion 1106 if necessary). A polygon approximating portion 1110 performs a polygon approximation (dividing-line-segment approximation) on the contour of the input figure using the Ramer's method or the like. For example, when the figure shown in FIG. 8 is input, the closed contour shown in FIG. 9 is extracted, and, then, the extracted contour is approximated by the polygon shown in FIG. 10.

A feature extracting portion 1115 analyzes the polygon-approximated contour based on quantized directional features and quasi-concavity/convexity structures, and integrates some consecutive line segments into higher-level structural features. Thereby, a compact expression of the structural features of the contour of the figure is obtained. The contents of the process for extracting the structural features based on quantized directional features and quasi-concavity/convexity structures is the same as the process in the first embodiment described with reference to the flowchart shown in FIG. 4.

For a set of model figures which are previously prepared, the structural features of the contour are previously extracted in the above-described method for each model figure, and the extracted structural features are stored in a dictionary 1125. When the figure is to be classified, in a matching portion 1120, matching between the structural features of the contour of the input figure input from the feature extracting portion 1115 and the structural features of the contour of the model figure input from the dictionary 1125 is performed. Thus, a degree of difference (or degree of similarity) between the contours of the input figure and the model figure is obtained. A classifying (recognizing) portion 1130 compares the degrees of difference (or the degrees of similarities) between the input figure and the respective model figures. Thus, the classifying (recognizing) portion 1130 selects one (or a plurality of) model figure(s) which is (are) most similar to the input figure. That is, the classifying (recognizing) portion 1130 selects one (or a plurality) of model figure(s), where the degree of difference between the thus selected model figure and the input figure is lowest (or the degree of similarity between the thus selected model figure and the input figure is highest).

The matching portion 1120 conceptually includes a correspondence determining portion 1121, a normalizing portion 1122 and a distance calculating portion 1123. The correspondence determining portion 1121 obtains the optimum correspondence relationship between the input figure and the model figure. Based on the obtained correspondence relationship, approximate point correspondence between the structural features of the contours of the input figure and the model figure is determined. Based on the determined point correspondence, the normalizing portion 1122 performs geometrical transformation of the model figure (normalization of the model figure) so as to cause the model figure to approach (to make the model figure more similar to) the input figure. The distance calculating portion 1123 calculates the distance between the model figure after undergoing the normalization performed by the normalizing portion 1122 and the input figure.

When obtaining the correspondence relationship between the structural features of the contours of the input figure and the model figure, the correspondence determining portion 1121 evaluates a cost required for editing the respective structural features so that the structural features of the two contours approach one another (that is, the structural features of the two contours become more similar). Then, the optimum correspondence relationship in which this editing cost is minimum is obtained. The editing of the structural features of the two contours and the cost thereof will now be described.

As described above, it is possible to obtain a compact expression using the structural features from the polygon-approximated contour. However, such an expression is likely to be affected by noise added to the contour and/or change in concavity/convexity occurring due to a scale in which the figure is observed. As described above, for example, the partial contour shown in FIG. 14A and the partial contour shown in FIG. 14B are generally very similar to one another. However, due to local deformation, the structural features thereof are different from one another. When N=4, the partial contour shown in FIG. 14A is expressed by the three segments which have the pairs of characteristic numbers <6, 6>, <2, 6> and <3, 2>, respectively, and are coupled as $S1\text{-}^r\text{-}S2\text{-}^h\text{-}S3$. In contrast to this, the partial contour shown in FIG. 14B is expressed by the five segments which have the pairs of characteristic numbers <6, 6>, <2, 6>, <2, 2>, <2, 6> and <3, 2>, respectively, and are coupled as $S1'\text{-}^r\text{-}S2'\text{-}^h\text{-}S3'\text{-}^r\text{-}S4'\text{-}^h\text{-}S5'$. Structure change due to noise or observation scale can be considered as deformation in the normal direction. Therefore, in order to absorb such deformation, it is considered that the respective structural features are edited so as to be similar to one another. For example, in the case of the two partial contours shown in FIGS. 14A and 14B, as shown in FIGS. 15A and 15B, the block of the segments {S1, S2, S3} are replated with one segment S so as to cover the portion S2, and the block of the segments {S1', S2', S3', S4' and S5'} are replaced with one segment S' so as to cover the portions S2' and S4'. Thus, the respective structural features are edited so as to be similar to one another.

When the above-mentioned processing is generalized, it is assumed that one partial contour comprises a block of m consecutive segments {S1, S2, ..., Sm}, and the other partial contour comprises a block of n consecutive segments {S1', S2', ..., Sn'}. It is assumed that the characteristic numbers of the segment Si (i=1, 2, ..., m) are $<r_i, d_i>$, and the characteristic numbers of the segment Si' (i=1, 2, ..., n) are $<r_i', d_i'>$. When the two partial contours fulfill the following condition (a) or (b), each block of segments is replaced with one segment. Specifically, when the condition (a): $S1\text{-}^h\text{-}S2\text{-}^r\text{-} \ldots \text{-}^r\text{-}Sm$, and, also, $S1'\text{-}^h\text{-}S2'\text{-}^r\text{-} \ldots \text{-}^r\text{-}Sn'$ is fulfilled, the segment block {S1, S2, ..., Sm} is replaced with one segment S having the characteristic numbers $$\left\langle \sum_{i=1}^{m} (-1)^{i+1} r_i, d_1 \right\rangle$$

and the segment block {S1', S2', ..., Sn'} is replaced with one segment S' having the characteristic numbers $$\left\langle \sum_{i=1}^{n} (-1)^{i+1} r_i', d_1' \right\rangle.$$

When the condition (b): $S1\text{-}^r\text{-}S2\text{-}^h\text{-} \ldots \text{-}^h\text{-}Sm$, and, also, $S1'\text{-}^r\text{-}S2'\text{-}^h\text{-} \ldots \text{-}^h\text{-}Sn'$ is fulfilled, the segment block {S1, S2, ..., Sm} is replaced with one segment S having the characteristic numbers $$\left\langle \sum_{i=1}^{m} (-1)^{i+1} r_i, d_m \right\rangle$$

and the segment block {S1', S2', ..., Sn'} is replaced with one segment S' having the characteristic numbers $$\left\langle \sum_{i=1}^{n} (-1)^{i+1} r_i', d_n' \right\rangle.$$

The above conditions (a) and (b) are conditions for the concavities/convexities of the two partial contours to coincide. Then, the editing cost required for replacing the two segment blocks {S1, S2, Sm}, {S1', S2', ..., Sm'} with segments S, S', respectively, is defined as follows, for example:

$$e(\{S_1, S_2, \ldots, S_m\} \Rightarrow S, \{S_1', S_2', \ldots, S_n'\} \Rightarrow S') =$$

$$|L(S_1 S_2 \ldots S_m) - L'(S_1' S_2' \ldots S_n')| +$$

$$\left( \sum_{i=1}^{\lfloor m/2 \rfloor} 1(S_{2i}) + \sum_{i=1}^{\lfloor n/2 \rfloor} 1'(S_{2i}') \right) + w \cdot \left| \sum_{i=1}^{m} (-1)^{i+1} r_i - \sum_{i=1}^{n} (-1)^{i+1} r_i' \right|.$$

In the above equation, $1'(S_i)$ represents the length of the segment Si (i=1, 2, ..., m), $1(S_i')$ represents the length of the segment Si' (i=1, 2, ..., n), $L(S_1 S_2 \ldots S_m)$ represents the length of the partial contour comprising {S1, S2, ..., Sm}, $L'(S_1' S_2' \ldots S_n')$ represents the length of the partial contour comprising {S1', S2', ..., Sn'}, and w represents a weighting coefficient. The first term of the right-hand side of the above equation indicates the difference between the lengths of the segments S and S' after the integration (length difference degree). The third term of the right-hand side of the above equation indicates the difference between the rotation amounts of the segments S and S' after the integration (rotation-amount difference degree). The second term of the right-hand side of the above equation indicates the sum total of the lengths of the segments which are covered through the integration. That is, the second term indicates the amount of deformation through the editing, and corresponds to the direct cost required for the editing operation. However, because the object is to evaluate the editing cost required for causing the structural features of the two partial contours to approach one another, it is necessary to consider the degree of difference between the segments obtained from the editing. This is because, when the degree of difference between the segments obtained from the editing is significantly large, such editing has no meaning. Therefore, in the above equation, the degrees of differences between the segments obtained from the editing are added, as correction terms, to the amount of deformation through the editing. Then, the thus-obtained value is evaluated as the editing cost. However the evaluation equation for the editing cost is not limited to the above equation. Another appropriate evaluation equation may be used. For example, the evaluation equation in which the editing cost is the value obtained as a result of multiplying by the third term of the right-hand side of the above equation may be used.

Figure 21:
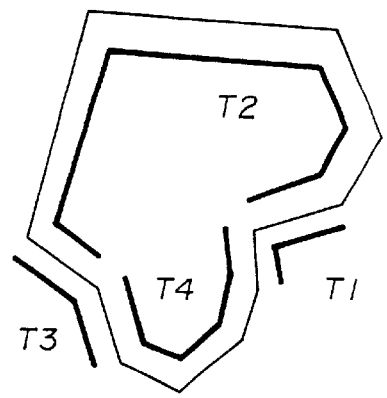
FIG. 21 shows an example of the contour of a model figure and a segment division thereof.

The structural features of the closed contour can be described by a circulating row, the elements of which are the segments. Therefore, the problem of finding correspondence between the structural features of the two contours is to find a set of editing operations through which the above-described editing cost required for replacing the blocks of segments with the segments is minimum as a whole. For example, matching is considered between the contour of the model figure and the contour of the input figure. The contour of the model figure is, as shown in FIG. 21, expressed by four segments T1, T2, T3 and T4 which have the pairs of characteristic numbers <3, 3>, <0, 7>, <2, 1>, <2, 1>, respectively, and are coupled as T1-$^h$-T2-$^t$-T3-$^h$-T4-$^t$-T1. The contour of the input figure is such as that shown in FIG. 13. Then, the correspondence for minimizing the total cost of editing is as follows:

$$\{S4, S1, S2\} \leftrightarrow \{T2, T3, T4\} \quad (1)$$

$$\{S3\} \leftrightarrow \{T1\} \quad (2)$$

Figure 10:
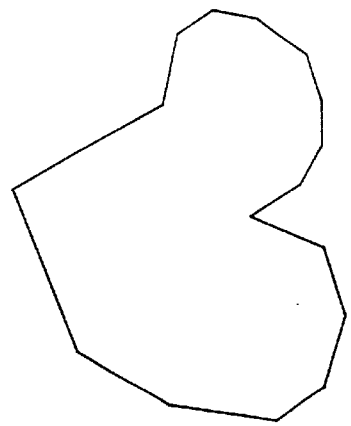
FIG. 10 shows a polygon which approximates the contour shown in FIG. 9.
Figure 22:
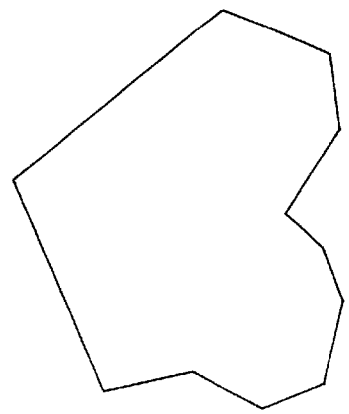
FIG. 22 shows an example of a figure obtained as a result of normalization of the model figure such as to cause the model figure to approach the input figure, shown in FIG. 13.
Figure 23:
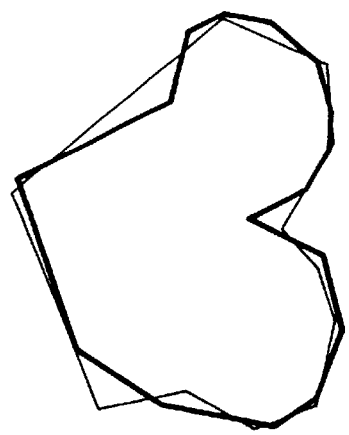
FIG. 23 shows the figures, shown in FIGS. 13 and 22, superimposed on one another.

Based on the thus-determined correspondence of the contours between the input figure and the model figure, the normalizing portion 1122 performs geometrical transformation, for example, affine transformation, on the model figure such that the model figure approaches the input figure. It is also possible to perform affine transformation on the input figure such that the input figure approaches the model figure. When affine transformation is performed on the model figure shown in FIG. 21 based on the above-mentioned correspondence of the segments blocks between the model figure and the input figure, the model figure shown in FIG. 21 is normalized into the figure shown in FIG. 22. Then, when the thus-normalized model figure is superimposed on the input figure shown in FIG. 10, FIG. 23 is obtained. Then, the degree of similarity or the degree of difference between the model figure and the input figure is obtained. The distance calculating portion 1123 calculates a geometric distance between the above-described normalized model figure and the input figure (the normalized input figure and the model figure when the input figure is normalized). As the distance scale therefor, the Hausdorff distance or the generalized Hausdorff distance can be used.

Figure 20:
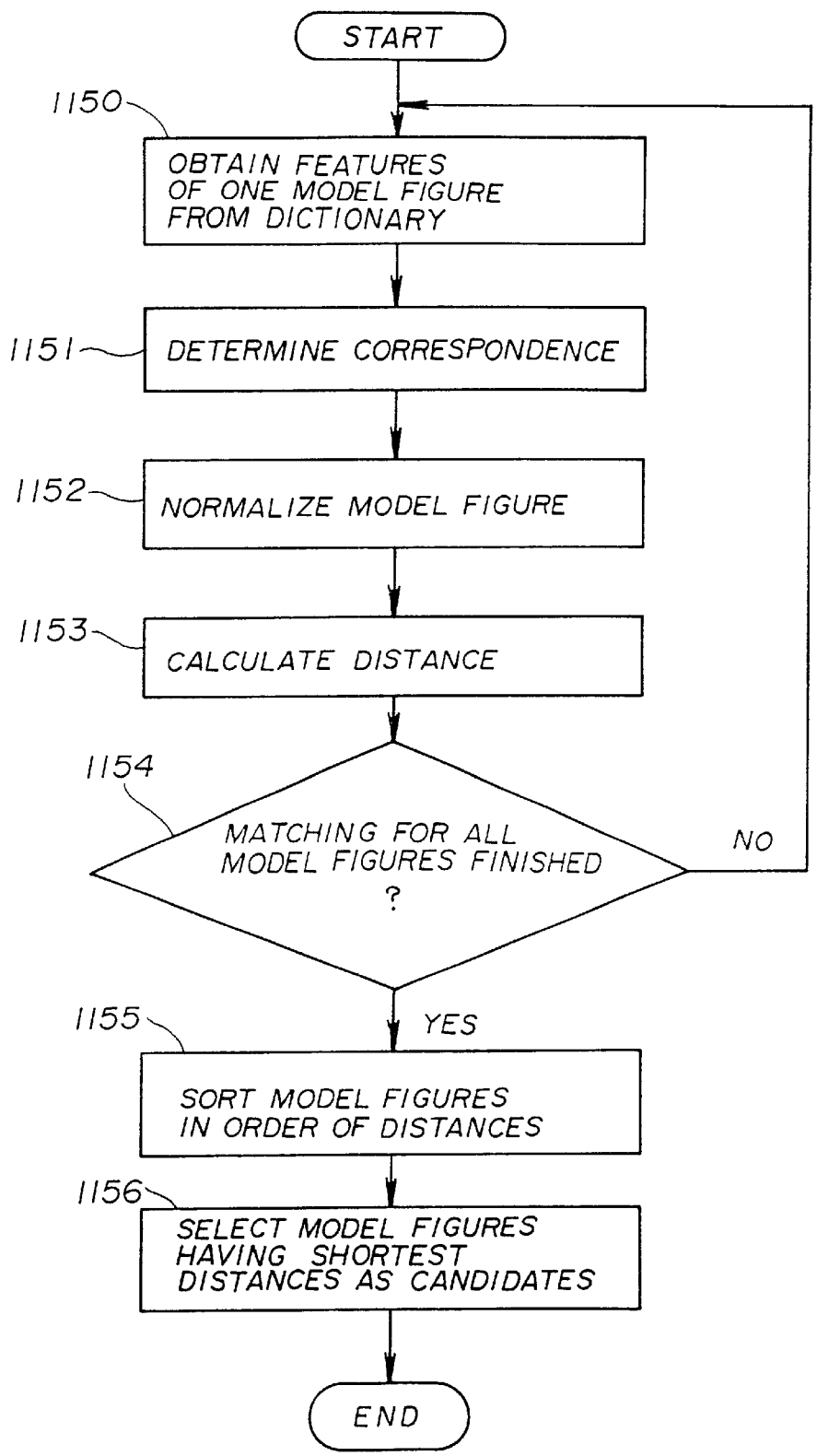
FIG. 20 is a flowchart showing a flow of a matching processing and a classifying processing.

Overall flow of the above-described processing performed by the matching portion 1120 and the classifying (recognizing) portion 1130 will now be summarized with reference to FIG. 20. The matching portion 1120 obtains the structural features of the contour of one model figure from the dictionary 1125 (in a step 1150). Then, the correspondence determining portion 1121 obtains the optimum correspondence of the structural features of the contours between the model figure and the input figure such that, as described above, the editing cost is minimum (in a step 1151). Then, based on the thus-obtained correspondence, the normalizing portion 1122 performs affine transformation on the model figure so that the model figure approaches the input figure (in a step 1152). Then, the distance calculating portion 1123 calculates the distance between the model figure which has undergone the affine transformation and the input figure. The matching portion performs the same processing for each model figure. Then, when the processing for the last model figure has been finished (YES in a step 1154), the data of distances obtained for the respective model figure is transferred to the classifying (recognizing) portion 1130, and the matching processing is finished. The classifying (recognizing) portion 1130 sorts the model figures in order of the distances obtained for the model figures (in a step 1155). Then, the model figure having the shortest distance (or a plurality of the model figures having the shortest distances) is (are) selected as a classification candidate(s). Then, the identifier(s) of the model figure(s) is (are) output as the classification (recognition) result (in a step 1156).

FIGS. 24, 25 and 26 show a flowchart of a specific example of a matching algorithm between one model figure and the input figure in the matching portion 1120. FIGS. 27 and 28 show an algorithm of a function segmentMatching( ) which is called in the matching algorithm.

This matching algorithm is based on dynamic programming. When it is assumed that the numbers of the segments on the two contours are m and n, respectively, the correspondence of the segment blocks can be found through an amount of work of O (mnlogm). Further, it is assumed that the segments (s(1), s(2), . . . , s(m)) of one contour (for example, the contour of the model figure) are arranged in the order of and so as to be coupled as $$S(1)\text{-}^h\text{-}s(2)\text{-}^t\text{- } \ldots \text{ -}^t\text{-}s(m)\text{-}^h\text{-}s(1)$$

and the segments (t(1), t(2), . . . , t(n)) of the other contour (for example, the contour of the input figure) are arranged in the order and so as to be coupled as $$t(1)\text{-}^h\text{-}t(2)\text{-}^t\text{- } \ldots \text{ -}^t\text{-}t(n)\text{-}^h\text{-}t(1)$$

Further, it is assumed that, formally, when m<i<=2*m, s(i)=s(i−m), and, when n<j<=2*n, t(j)=t(j−n). Further, it is assumed that the maximum number of the consecutive segments which are integrated through block replacement is MB. left[2*n][2*m] and right [2*n][2*m] are two-dimensional integer arrangements for recording ranges of the segment blocks through which s, t can correspond to one another.

A loop 1 from a step 1201 through a step 1235 is repeated with x being incremented by one at a time until x exceeds min(m, MB). In this loop 1, a shift series S(x)=(s(x), s(x+1), . . . , s(x+m−1)) of s which has undergone a shift by x−1 (x=1, . . . , min(m, MB)) is considered. In a step 1203 and a step 1221, as a result of the function segmentMatching( ) being called, a correspondence between the shift series S(x) and a shift series T(j)=(t(j), t(j+1), . . . , t(j+n−1)) of t is found. Through steps 1204 through 1210 and 1222 through 1228, based on a pointer set in the function segmentMatching( ), a correspondence of the segment blocks between S(x) and T(j) is determined. The function segmentMatching( ) requires an amount of work of O (mn) when approximate string matching by Wagner-Fisher is applied. Then, when a matching is performed in a manner of a round robin, an amount of work of O (m·n2) is needed in total. However, as a result of a generation sequence of T(j) being in accordance with a binary-search manner (steps 1215–1218, 1232), and the correspondable ranges of the segment blocks being recorded in the two arrangements 'left', 'right', it is possible to find the correspondence of the segment blocks through an amount of work of O (mnlogm). This is an extension of the method described by M. Maes, "On a Cyclic String-to-String Correction Problem," Information Processing Letters, vol. 35, pages 73–78, 1990.

In the algorithm shown in FIGS. 24–26, dmin is a variable for the minimum value of the distance. Before the loop 1 is started, in a step 1200, dmin is initially set to infinity. Inside the loop 1, in a step 1202, after 0 is substituted in left[j][0] where j=1, 2, . . . , n, 1 is substituted in left[1][0]. In a step 1203, segmentMatching( ) is called as a result of arguments being set as shown in the figure. A loop 2 from a step 1205 through a step 1211 is repeated while i0>=0. In a step 1206 of the loop 2, (k0, l0) indicating the end of the preceding segment is used as a pointer from (i0, j0) which is the end of the current segment set by segmentMatching( ). A loop 3 from a step 1207 through a step 1209 is repeated while the condition that k0>=0 and also i0>k0 are fulfilled. In a loop 4 from a step 1212 through a step 1214, with i being incremented by one at a time from x to xmax−1, left[1][i]+n is substituted in left[n+1][i] and right[1][i]+n is substituted in right[n+1][i]. A loop 5 starting from a step 1216 is repeated while j<n. In the loop 5, a loop 6 from a step 1217 through a step 1230 is included. The loop 6 is repeated with k being incremented by one at a time until k exceeds j. In a step 1221 of the loop 6, segmentMatching( ) is called as a result of arguments being set as shown in the figure. A loop 7 from a step 1223 through a step 1229 is repeated while i0>=0. In a step 1224, (k0, l0) indicating the end of the preceding segment is used as a pointer from (i0, j0) which is the end of the current segment set by segmentMatching( ). A loop 8 from a step 1225 through a step 1227 is repeated while k>=0 and also i0>k0. In a step 1234, the correspondence of the segment blocks having dmin is determined to be the optimum correspondence between the two contours at the time. The final optimum correspondence and the distance dmin is determined in the step 1234 of the final cycle of the loop 1.

The function segmentMatching( ) shown in FIGS. 27 and 28 has the shift amounts x and y of the segment series s and t, the arrangements 'left' and 'right' for recording the correspondable ranges of the segment blocks, and the minimum value dmin of the distances between the figures obtained from the correspondences of the segment blocks which have been found until now provided thereto as arguments. Then, between the shift series S(x)=(s(x), s(x+1), . . . , s(x+m−1)) of s and the shift series T(j)=(t(j), t(j+1), . . . , t(j+n−1)) of t, the correspondence of the segment blocks in which the editing cost required for the block replacement is minimum is obtained by the function segmentMatching( ). The algorithm which is described here is an extension of the algorithm of Wagner-Fisher which obtains, based on DP, an approximate correspondence between two character series.

In a first step 1300, infinity is substituted in D(x−1, l) where l=0 through 2*n−1 and in D(k, y−1) where k=0 through 2*m−1. 0 is substituted in D(x−1, y−1). x+m is substituted in xmax. y+n is substituted in ymax. Then, a loop 1 is started. The loop 1 is repeated with i being incremented by one at a time from x until i exceeds xmax−1. A loop 2 in the loop 1 is repeated with j being incremented by one at a time from y until j exceeds ymax−1. In a step 1305, k and l which minimize the sum of the editing cost 'e' required for the block replacement of s(i−k+1), s(i−k+2), . . . , s(i) and t(j−l+1), t(j−l+2), . . . , t(j), and D(i−k, j−l) are set as k0, l0. 'e' used for the determination of a step 1306 is the value of the editing cost when k=k0, l=l0.

In a step 1310, as a result of pointers being traced forward from (xmax−1, ymax−1), the model figure is normalized based on the correspondence having the minimum editing cost, and the distance d between the model figure which has undergone the normalization and the input figure is obtained. That is, for each set of the corresponding segment blocks, the same number of corresponding points are selected on the two contours. Then, affine transformation is calculated such as to transform the figure of S(x) to a figure similar to the figure of T(j) through the least-square method. The distance between the T(j) and S(x) which has undergone the affine transformation is obtained through the method of Hausdorff distance:

$$D(A, B) = \max(\delta(A, B), \delta(B, A)), \delta(A, B) = \max_{a \in A} \min_{b \in B} \|a - b\|$$

(where A, B are point sets) or the method of generalized Hausdorff distance:

$$D(A, B) = \max(\delta(A, B), \delta(B, A)), \delta(A, B) = \frac{1}{\#A} \sum_{a \in A} \min_{b \in B} \|a - b\|.$$

Then, when the thus-obtained distance d is smaller than the minimum value dmin of the distances which has been obtained until then, the distance d is substituted in dmin (in steps 1311, 1312), and the value of dmin is returned as a returning value (in a step 1313).

In the second embodiment, as is clear from the above description, even when deformation of the figure and change in the structural features of the contour occur due to noise and/or global/local transformation, determination of correspondence between the structural features of the contours of the two figures and normalization of the figure are appropriately performed, and, thereby, the degree of similarity or the degree of difference between the figures can be evaluated with high accuracy. Further, because the determination of correspondence and the normalization are processing in the feature space, the amount of required calculations is relatively small. Accordingly, it is possible to perform the figure classification which is efficient and is robust for deformation of the figure and change in the features occurring due to noise and/or global/local transformation.

The figure classifying system in the second embodiment can be achieved by a computer, for example, having the arrangement simply shown in FIG. 3, through execution of a program. The dictionary 1125, shown in FIG. 19, which is a set of the structural features of the model figures, is stored in the large-capacity storage device 210 shown in FIG. 3. In the computer, the figure classifying program 1126, shown in FIG. 3, for executing the functions of the respective functional portions 1100, 1105, 1110, 1115, 1120 (1121, 1122, 1123) and 1130, shown in FIG. 19, is, for example, read from the disk medium 235 set in the disk drive 230, and is stored in the large-capacity storage device 210. The entirety of or a part of this program 1126 is loaded in the memory 205 when it is necessary, and is executed by the CPU 200. The image or line figure of the input figure is input through the inputting device 215.

Further, the present invention is not limited to the above-described embodiments, and variations and modifications may be made without departing from the scope of the present invention.

The contents of the basic Japanese Patent Application No. 9-295237, filed on Oct. 28, 1997, No. 9-310152, filed on Nov. 12, 1997 and No. 10-188408, filed on Jul. 3, 1998, are hereby incorporated by reference.

What is claimed is:

1. A figure classifying method comprising the steps of:
    a) providing stored data corresponding to structural features of model figures and structural features of first deformed figures produced from said structural features of said model figures; and subsequently, inputting a figure;
    b) extracting structural features of the input figure;
    c) producing structural features of second deformed figures, in accordance with a specific transformation rule, from the extracted structural features; and
    d) classifying the input figure based on said stored data, the extracted structural features of said input figure and said structural features of said second deformed figures.

2. The figure classifying method as claimed in claim 1, wherein said step d) comprises the steps of:
    d1) calculating indexes from the structural features extracted in said step b) and produced in said step c);
    d2) referring to model identifier lists of entries of a table, which entries correspond to the indexes, in said table, calculated in said step d1), respectively; and
    d3) voting on model identifiers included in the model identifier lists referred to in said step d2),
        wherein each index of said table is calculated from either the structural features of a model figure, the model identifier of which is included in the model identifier list of the entry corresponding to said index, or the structural features of a deformed figure produced in accordance with a specific transformation rule from the structural features of the model figure.

3. The figure classifying method as claimed in claim 1, further comprising the step of
    e) searching a figure database based on a result of said step d).

4. The figure classifying method as claimed in claim 3, wherein said step d) and step e) comprise the steps of:
    d1) calculating indexes from the structural features extracted in said step b) and produced in said step c);
    d2) referring to model identifier lists of entries of a table, which entries correspond to the indexes, in said table, calculated in said step d1), respectively;
    d3) on voting model identifiers included in the model identifier lists referred to in said step d2); and
    e1) searching a figure database using the model identifiers as search keys, the numbers of votes of said model identifiers being larger,
        wherein each index of said table is calculated from either the structural features of a model figure, the model identifier of which is included in the model identifier list of the entry corresponding to said index, or the structural features of a deformed figure produced in accordance with a specific transformation rule from the structural features of the model figure.

5. A figure classifying system comprising:
    a figure inputting portion inputting a figure;
    a feature extracting portion extracting structural features of the input figure;
    a feature producing portion producing structural features of deformed figures, in accordance with a specific transformation rule, from the extracted structural features, wherein the specific transformation rule comprises rules for a plurality of feature transformations selected from a group consisting of a change along a normal line of a contour, change of characteristic number due to rotation of the figure, and local transformation of the figure;
    a storing portion storing a table; and
    a classifying portion calculating indexes from die structural features extracted by said feature extracting portion and produced by said feature producing portion, referring to model identifier lists of entries of said table, which entries correspond to the thus-calculated indexes in said table, and voting on model identifiers included in the thus-referred-to model identifier lists, wherein some of said indexes of said table are calculated from the structural features of a model figure, the model identifier of which is included in the model identifier list of the entry corresponding to said index, and wherein others of said indexes of said table are calculated from the structural features of a deformed figure produced in accordance with a specific transformation rule from the structural features of the model figure.

6. The figure classifying system as claimed in claim 5, further comprising a figure database, wherein said classifying portion searching said figure data base using the model identifiers as search keys, the numbers of votes of said model identifiers being larger.

7. A method for producing a table for figure classification comprising the steps of:
    a) extracting structural features of each model figure included in a set of model figures;
    b) producing structural features of deformed figures, in accordance with a specific transformation rule, from structural figures extracted in said step a); and
    c) producing a table for figure classification, wherein some of said indexes of said table are calculated from the structural features extracted from said model figure in said step a), an identifier of which model figure is included in a model identifier list of an entry corresponding to said index, and wherein others of said indexes of said table are calculated from the structural features produced in said step b).

8. A computer-readable information recording medium storing a figure classifying program for causing a computer to function as:
    figure inputting means for inputting a figure;
    feature extracting means for extracting structural features of the input figure;
    feature producing means for producing structural features of deformed figures, in accordance with a specific transformation rule, from the extracted structural features, wherein the specific transformation rule comprises rules for a plurality of feature transformations selected from a group consisting of a change along a normal line of a contour, change of characteristic number due to rotation of the figure, and local transformation of the figure; and
    classifying means for calculating indexes from the structural features extracted by said feature extracting means and produced by said feature producing means, referring to model identifier lists of entries of a table, which entries correspond to the thus-calculated indexes in said table, and voting on model identifiers included in the thus-referred-to model identifier lists, wherein some of said indexes of said table are calculated from the structural features of a model figure, the model identifier of which is included in the model identifier list of the entry corresponding to said index, and wherein others of said indexes of said table are calculated from the structural features of a deformed figure produced in accordance with a specific transformation rule from the structural features of the model figure.

9. The computer-readable information recording medium storing the figure classifying program as claimed in claim 8, wherein said classifying means searching a figure data base using the model identifiers as search keys, the numbers of votes of said model identifiers being larger.

10. The figure classifying method as claimed in claim 1, wherein the specific transformation rule comprises rules for a plurality of feature transformations selected from a group consisting of a change along a normal line of a contour, change of characteristic number due to rotation of the figure, and local transformation of the figure.

11. The figure classifying method of claim 10, wherein said step of providing stored data includes the steps of applying transformation rules to said first deformed figures, and wherein the number of said transformation rules applied to said structural features of said first deformed figures is greater than the number of rules applied to said structural features of said second deformed figures, such that at least one of said transformation rules applied to said structural features of said first deformed figures is not applied to said structural features of said second deformed figures.

12. The method of claim 7, wherein the specific transformation rule comprises rules for a plurality of feature transformations selected from a group consisting of a change along a normal line of a contour, change of characteristic number due to rotation of the figure, and local transformation of the figure.

* * * * *